US009488083B2

(12) United States Patent
Nozaki

(10) Patent No.: US 9,488,083 B2
(45) Date of Patent: Nov. 8, 2016

(54) INTERNAL COMBUSTION ENGINE

(71) Applicant: Yusuke Nozaki, Susono (JP)

(72) Inventor: Yusuke Nozaki, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/653,912

(22) PCT Filed: Dec. 20, 2012

(86) PCT No.: PCT/JP2012/083139
§ 371 (c)(1),
(2) Date: Jun. 19, 2015

(87) PCT Pub. No.: WO2014/097460
PCT Pub. Date: Jun. 26, 2014

(65) Prior Publication Data
US 2015/0330276 A1    Nov. 19, 2015

(51) Int. Cl.
*F01N 3/36*        (2006.01)
*F01N 3/20*        (2006.01)
*F02D 29/02*       (2006.01)
*B60W 10/04*       (2006.01)
(Continued)

(52) U.S. Cl.
CPC ............. *F01N 3/20* (2013.01); *B60W 10/04* (2013.01); *F01N 3/0814* (2013.01); *F01N 3/0842* (2013.01); *F01N 3/0871* (2013.01); *F01N 3/36* (2013.01); *F02D 29/02* (2013.01); *F02D 41/0055* (2013.01); *F02D 41/022* (2013.01); *F02D 41/0275* (2013.01); *F02D 41/1498* (2013.01); *F01N 2610/03* (2013.01); *F01N 2610/1453* (2013.01); *F02D 41/405* (2013.01); *F02M 26/05* (2016.02); *F02M 26/06* (2016.02); *F02M 26/14* (2016.02); *F16H 61/143* (2013.01); *Y02T 10/47* (2013.01)

(58) Field of Classification Search
CPC ............. F01N 3/0814; F01N 2610/03; F01N 2610/1453; F01N 2900/0408; F01N 2900/18; F02M 26/06; F02M 26/14
USPC ........................... 60/278, 286, 295, 301, 303
See application file for complete search history.

(56) References Cited

U.S. PATENT DOCUMENTS

| 2005/0197759 | A1* | 9/2005 | Surnilla | F02P 5/1504 701/103 |
|---|---|---|---|---|
| 2012/0131908 | A1 | 5/2012 | Bisaiji et al. | |
| 2014/0123631 | A1* | 5/2014 | Smith | F01N 3/0842 60/274 |

FOREIGN PATENT DOCUMENTS

| JP | 2000-27630 | 1/2000 |
|---|---|---|
| JP | 2010-222972 | 10/2010 |

(Continued)

*Primary Examiner* — Thomas Denion
*Assistant Examiner* — Jorge Leon, Jr.
(74) *Attorney, Agent, or Firm* — Finnegan, Henderson, Farabow, Garrett & Dunner, LLP

(57) ABSTRACT

An internal combustion engine, wherein an exhaust purification catalyst (13) and a hydrocarbon supply valve (15) are arranged in an engine exhaust passage, the internal combustion engine being provided with a low-pressure exhaust gas recirculation device (LPL) for recirculating exhaust gas downstream of the exhaust air purification catalyst (13). When a lock up clutch (66) in a torque converter (27) should engage, non-sliding engagement of the lock up clutch (66) is prohibited in a case where an exhaust gas recirculation action is performed by the low-pressure exhaust gas recirculation device (LPL) and hydrocarbons are sprayed from the hydrocarbon supply valve (15) at predetermined cycles.

5 Claims, 20 Drawing Sheets

(51) Int. Cl.
*F01N 3/08* (2006.01)
*F02D 41/02* (2006.01)
*F02D 41/14* (2006.01)
*F02D 41/00* (2006.01)
*F02D 41/40* (2006.01)
*F16H 61/14* (2006.01)

(56) References Cited

FOREIGN PATENT DOCUMENTS

| JP | 2011-241752 | 12/2011 |
| WO | WO 2011/114499 A1 | 9/2011 |

* cited by examiner

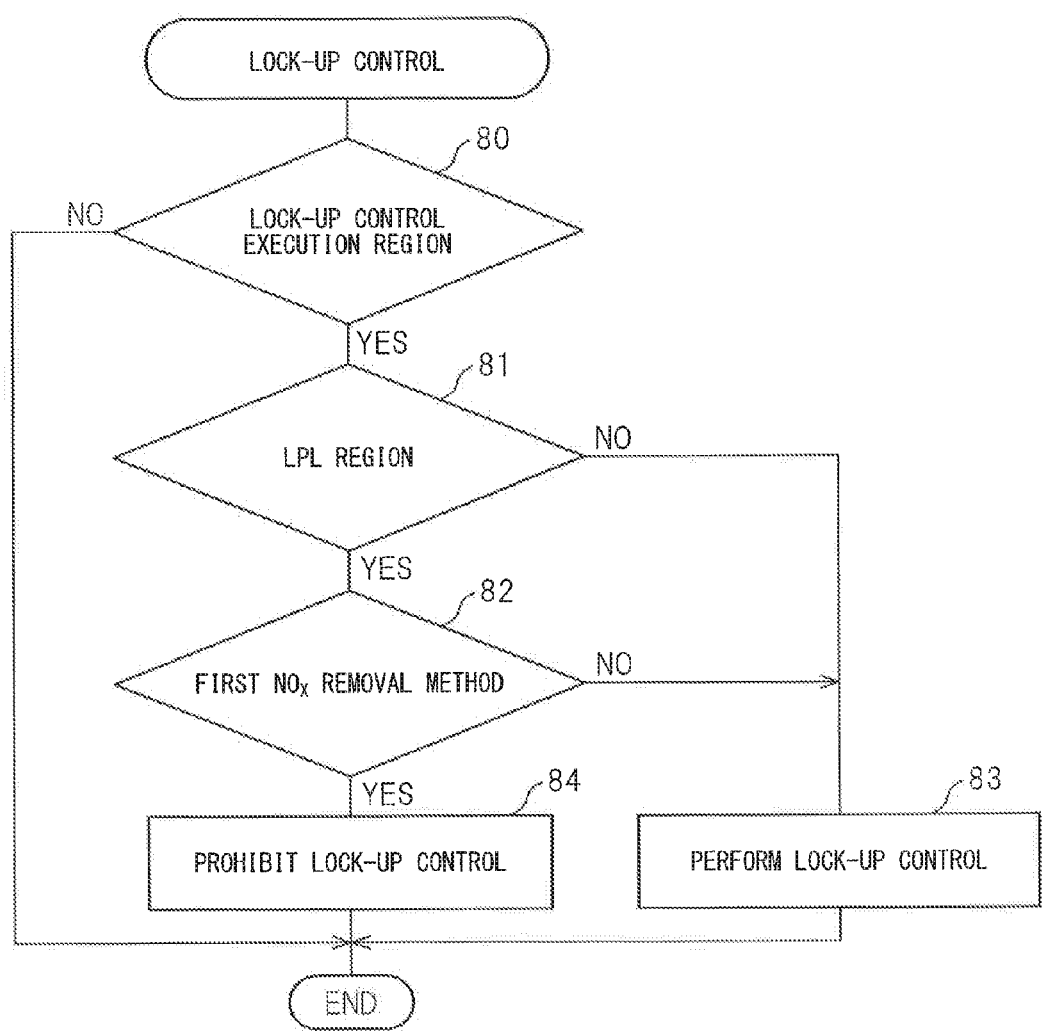

INTERNAL COMBUSTION ENGINE

CROSS-REFERENCE TO RELATED APPLICATIONS

This application is a national phase application of International Application No. PCT/JP2012/083139, filed Dec. 20, 2012, the content of which is incorporated herein by reference.

TECHNICAL FIELD

The present invention relates to an internal combustion engine.

BACKGROUND ART

Known in the art is an internal combustion engine wherein an $NO_X$ storage reduction catalyst is arranged in an engine exhaust passage and a hydrocarbon feed valve is arranged in an engine exhaust passage upstream of the $NO_X$ storage reduction catalyst, a low pressure exhaust gas recirculation system is provided for recirculating exhaust gas inside the engine exhaust passage downstream of the $NO_X$ storage reduction catalyst to the inside of the intake passage, and hydrocarbons are fed from a hydrocarbon feed valve to make the air-fuel ratio of the exhaust gas flowing into the $NO_X$ storage reduction catalyst temporarily rich when releasing the stored $NO_X$ from the $NO_X$ storage reduction catalyst (for example, see PTL 1). In this regard, in this internal combustion engine, if hydrocarbons are injected from the hydrocarbon feed valve to release $NO_X$ from the $NO_X$ storage reduction catalyst, exhaust gas which includes a large amount of hydrocarbons is recirculated by the low pressure exhaust gas recirculation system to the inside of the intake passage. As a result, the air-fuel ratio inside the combustion chamber becomes low, so fluctuation of combustion occurs and torque fluctuation which gives a passenger an uncomfortable feeling ends up occurring. Therefore, in this internal combustion engine, to prevent such torque fluctuation from occurring, when hydrocarbons are injected from the hydrocarbon feed valve to release $NO_X$ from the $NO_X$ storage reduction, the amount of recirculated exhaust gas which is recirculated inside the intake passage in synchronization with the recirculation timing of hydrocarbons by the low pressure exhaust gas recirculation system is reduced.

CITATION LIST

Patent Literature

PTL 1. Japanese Patent Publication No. 2010-222972A

SUMMARY OF INVENTION

Technical Problem

In this regard, the action of injection of hydrocarbons from the hydrocarbon feed valve for releasing $NO_X$ from the $NO_X$ storage reduction catalyst is performed by a relatively long period. When in this way the injection period of hydrocarbons from the hydrocarbon feed valve is relatively long, it is possible to reduce the amount of recirculated exhaust gas which is recirculated inside the intake passage in synchronization with the recirculation timing of hydrocarbons by the low pressure exhaust gas recirculation system. However, when using a new $NO_X$ removal method which removes the $NO_X$ by injecting hydrocarbons from the hydrocarbon feed valve in a period which is shorter than the injection period of hydrocarbons for releasing $NO_X$ from the $NO_X$ storage reduction catalyst, since the injection period of hydrocarbons is short, it is impossible to reduce the amount of recirculated exhaust gas which is recirculated inside the intake passage synchronized with the recirculation timing of hydrocarbons by the low pressure exhaust gas recirculation system. Further, if reducing the amount of exhaust gas which is recirculated inside the intake passage, there is the separate problem of an increase in the amount of $NO_X$ which is generated in the combustion chamber.

An object of the present invention is to provide an internal combustion engine which reduces the level of torque fluctuation which is transmitted to a passenger when using a new $NO_X$ removal method which removes the $NO_X$ by injecting hydrocarbons from the hydrocarbon feed valve in a period which is shorter than the injection period of hydrocarbons for releasing $NO_X$ from the $NO_X$ storage reduction catalyst.

Solution to Problem

According to the present invention, there is provided an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on exhaust gas flow surfaces of the exhaust purification catalyst, basic exhaust gas flow surface parts are formed around the precious metal catalysts, the exhaust purification catalyst has a property of reducing $NO_X$ which is contained in the exhaust gas if making a concentration of hydrocarbons flowing into the exhaust purification catalyst vibrate within a predetermined range of amplitude and within a predetermined range of period and has a property of being increased in storage amount of $NO_X$ which is contained in the exhaust gas if making a vibration period of the hydrocarbon concentration longer than the predetermined range, and if hydrocarbons are injected from the hydrocarbon feed valve within said predetermined range of period during engine operation, $NO_X$ which is contained in the exhaust gas is removed at the exhaust purification catalyst, wherein a low pressure exhaust gas recirculation system which causes exhaust gas in the engine exhaust passage downstream of the exhaust purification catalyst to be recirculated into an intake passage is provided, a torque converter which is provided with a lock-up clutch is arranged between an output shaft of the engine and a transmission, the output shaft of the engine is fluidly coupled with an input shaft of the transmission when an engagement action of the lock-up clutch is not being performed, the output shaft of the engine is mechanically coupled with the input shaft of the transmission when an engagement action of the lock-up clutch is being performed, and, when an engagement action of the lock-up clutch should be performed, if an exhaust gas recirculation action by the low pressure exhaust gas recirculation system is being performed and hydrocarbons are injected from the hydrocarbon feed valve within the above-mentioned predetermined range of period, non-sliding engagement of the lock-up clutch is prohibited constantly or in accordance with a magnitude of a torque fluctuation of an engine output.

Advantageous Effects of Invention

The torque fluctuation which occurs in an engine when the low pressure exhaust gas recirculation system is used to recirculate the hydrocarbons is made to be absorbed by a torque converter by control of the engagement action of a lock-up clutch, whereby the level of torque fluctuation which is transmitted to a passenger is reduced.

BRIEF DESCRIPTION OF DRAWINGS

FIG. 21 is a flow chart for performing a lock-up control.

DESCRIPTION OF EMBODIMENTS

Figure 1:
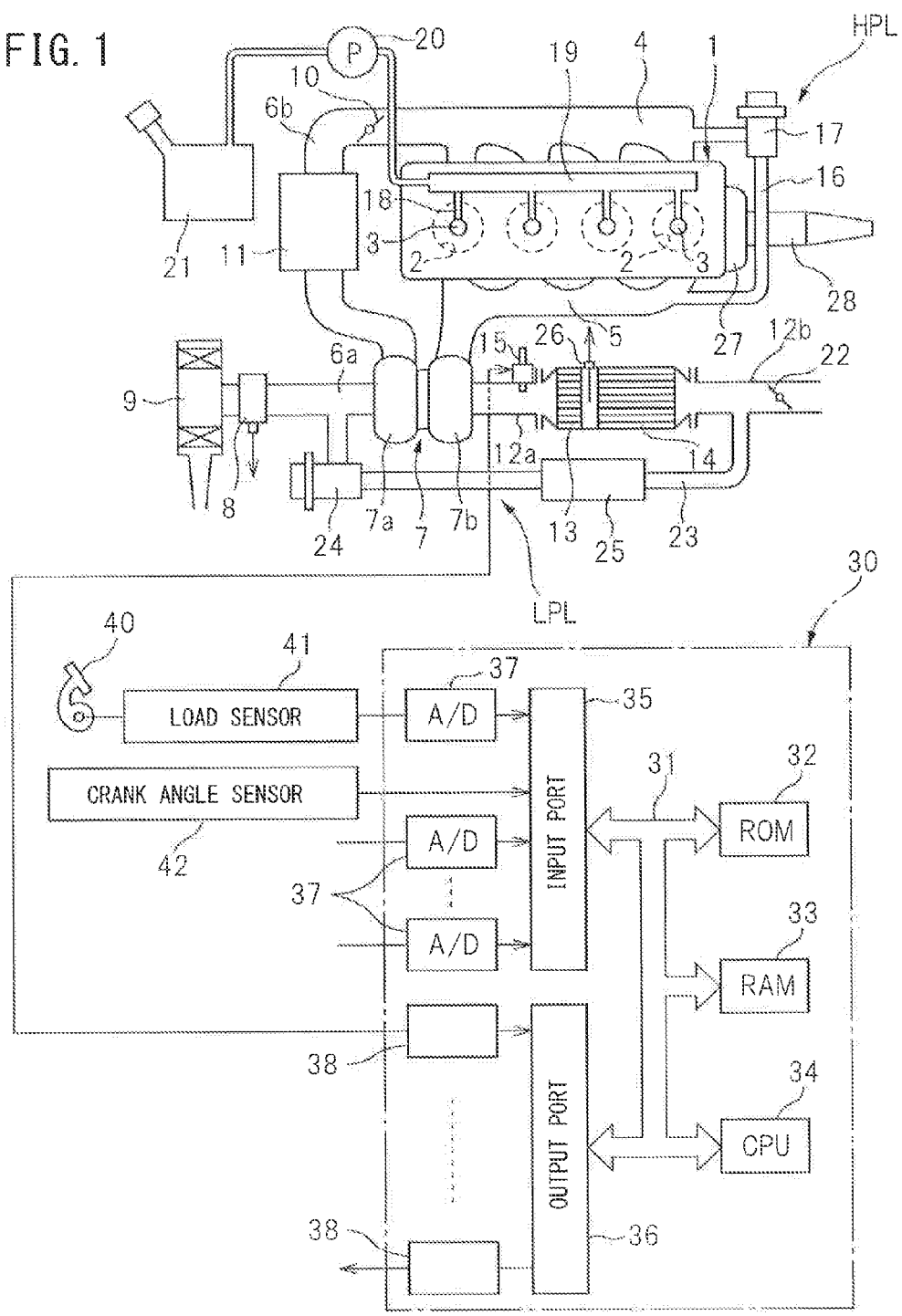
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6b to an outlet of a compressor 7a of an exhaust turbocharger 7, while an inlet of the compressor 7a is connected through an intake duct 6a and an intake air amount detector 8 to an air cleaner 9. Inside the intake duct 6b, a throttle valve 10 which is driven by an actuator is arranged. Around the intake duct 6b, a cooling device 11 is arranged for cooling the intake air which flows through the inside of the intake duct 6b. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12a to an inlet of an exhaust purification catalyst 13. In an embodiment of the present invention, this exhaust purification catalyst 13 is comprised of an $NO_X$ storage catalyst 13. A particulate filter 14 is arranged downstream of the exhaust purification catalyst 13, and an outlet of the particulate filter 14 is connected to an exhaust pipe 12b. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, each fuel injector 3 is connected through a fuel feed tube 18 to a common rail 19. This common rail 19 is connected through an electronically controlled variable discharge fuel pump 20 to a fuel tank 21. The fuel which is stored inside of the fuel tank 21 is fed by the fuel pump 20 to the inside of the common rail 19. The fuel which is fed to the inside of the common rail 19 is fed through each fuel feed tube 18 to the fuel injector 3.

On the other hand, downstream of the particulate filter 14 inside of the exhaust pipe 12b, an exhaust control valve 22 which is driven by an actuator is arranged. The inside of the exhaust pipe 12b between this exhaust control valve 22 and particulate filter 14 is connected through an EGR passage 23 to the intake pipe 6a. Inside this EGR passage 23, an electronic control type EGR control valve 24 is arranged. Further, around the EGR passage 23, a cooling device 25 is arranged for cooling the exhaust gas which flows through the inside of the EGR passage 23. In the embodiment which is shown in FIG. 1, the engine cooling water is guided to the inside of the cooling device 25 where the engine cooling water is used to cool the exhaust gas. In addition, a torque converter 27 which is connected to the output shaft of the engine is attached to the engine body 1, and a transmission 28 is connected to the torque converter 27. Namely, the torque converter 27 is arranged between the output shaft of the engine and the transmission 28.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. A temperature sensor 26 for detecting the temperature of the exhaust purification catalyst 13 is arranged downstream of the exhaust purification catalyst 13. The output signals of the temperature sensors 26 and the intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valves 17, 24, fuel pump 20 and actuator for driving the exhaust control valve 22. In addition, the torque converter 27 and the transmission 28 are connected to both the input port 35 and the output port 36.

As explained above, in the embodiment which is shown in FIG. 1, an exhaust gas recirculation system HPL which is comprised of the EGR passage 16 and EGR control valve 17 and an exhaust gas recirculation system LPL which is comprised of the EGR passage 23 and EGR control valve 24, that is, two exhaust gas recirculation systems, are provided. In this case, as will be understood from FIG. 1, in the exhaust gas recirculation system HPL, the exhaust gas in the exhaust manifold 5 is recirculated, while in the exhaust gas recirculation system LPL, the exhaust gas downstream of the particulate filter 14 in the exhaust pipe 12b is recirculated. In this regard, in this case, the pressure of the exhaust gas in the exhaust manifold 5 is considerably higher than the pressure of the exhaust gas in the exhaust pipe 12b downstream of the exhaust purification catalyst 13 and the particulate filter 14. Therefore, the exhaust gas recirculation system HPL will hereinafter be called the "high pressure exhaust gas recirculation system" for recirculating the relatively high pressure exhaust gas in the engine exhaust passage upstream of the exhaust turbine 7b to the inside of the intake passage downstream of the compressor 7a, while the exhaust gas recirculation system LPL will hereinafter be called the "low pressure exhaust gas recirculation system" for recirculating the relatively low pressure exhaust gas in the engine exhaust passage downstream of the exhaust purification catalyst 13 and the particulate filter 14 to the inside of the intake passage upstream of the compressor 7a.

Figure 2A:
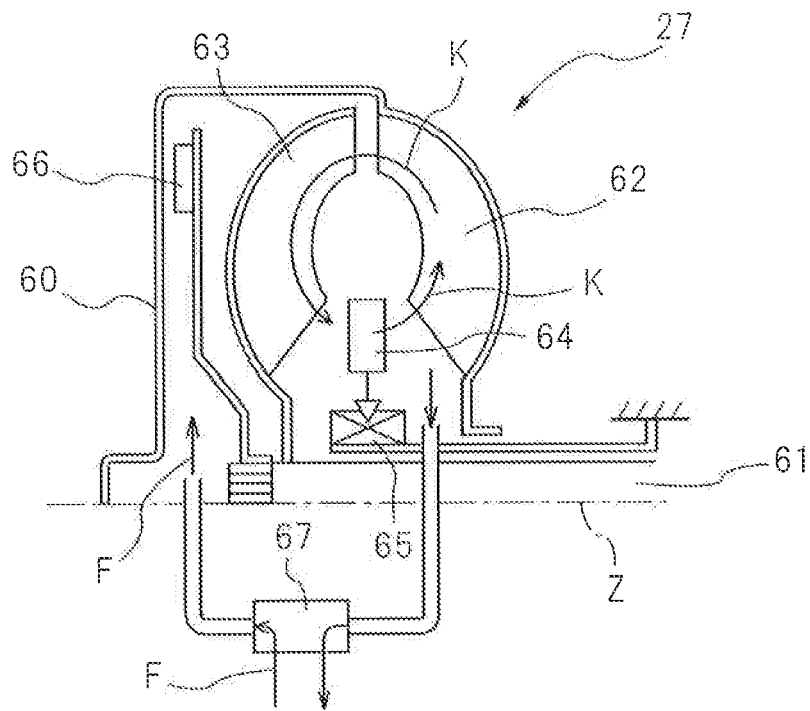
FIGS. 2A and 2B are views which schematically show a torque converter.
Figure 2B:
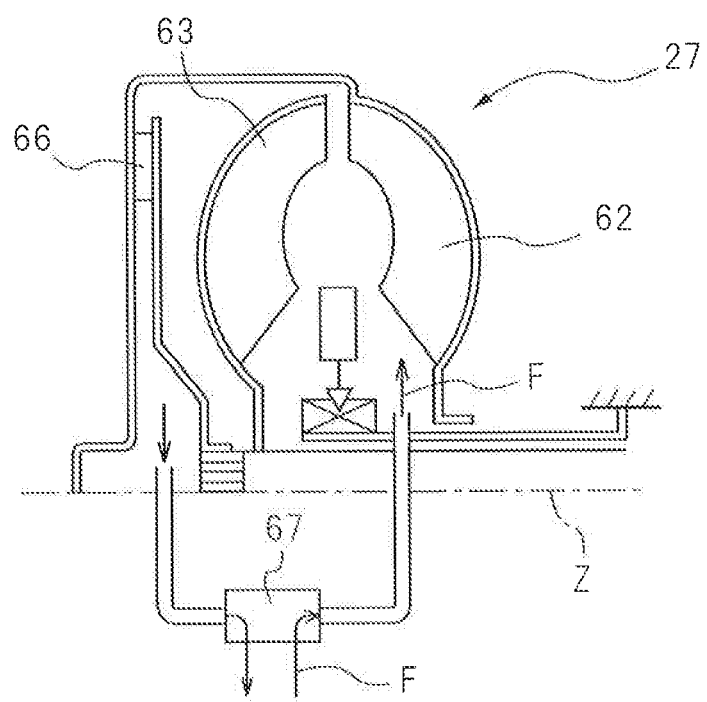

FIGS. 2A and 2B schematically show the structure of the torque converter 27. Note that, in FIGS. 2A and 2B, a dash and dot line Z shows a center axis line of the torque converter 27. FIGS. 2A and 2B show the structure of only one side of this center axis line Z. Referring to FIGS. 2A and 2B, 60 indicates a front cover which rotates together with the output shaft of the engine, 61 an input shaft of the transmission 28, 62 a pump impeller which is fastened to the front cover 60 and rotates together with the front cover 60, 63 a turbine runner which is fastened to the input shaft 61 of the transmission 28 and rotates together with the input shaft 61 of the transmission 28, 64 a stator which can rotate in only one direction about the center axis line Z by a one-directional clutch mechanism 65 which is supported by the body of the transmission 28, 66 a lock-up clutch which rotates together with the input shaft 61 of the transmission 28 and can move in a center axis line Z direction by spline engagement with the input shaft 61 of the transmission 28, and 67 a pressure control device for controlling the working oil pressure which acts on the left side of the lock-up clutch 66 and the working oil pressure which acts on the right side of the lock-up clutch 66 at FIGS. 2A and 2B.

The pressure control device 67 has for example a spool valve which is driven by a solenoid. As shown in FIG. 2A by the arrow mark, if the working oil which is discharged from the oil pump is fed between the inside wall surface of the front cover 60 and the lock-up clutch 66 by the flow path switching action by the spool valve of the pressure control device 67, the working oil pressure which acts at the left side of the lock-up clutch 66 in FIG. 2A becomes higher than the working oil pressure which acts at the right side of the lock-up clutch 66. At this time, the lock-up clutch 66 separates from the inside wall surface of the front cover 60, therefore the lock-up clutch 66 is not engaged. As opposed to this, if, as shown in FIG. 2B by the arrow mark F, the working oil which is discharged from the oil pump is fed to the right side of the lock-up clutch 66 by the flow path switching action by the spool valve of the pressure control device 67, the working oil pressure which acts at the right side of the lock-up clutch 66 in FIG. 2B becomes higher than the working oil pressure which acts at the left side of the lock-up clutch 66. At this time, the lock-up clutch 66 is pressed on the inside wall surface of the front cover 60. Due to this, the lock-up clutch 66 becomes the engaged state.

As shown in FIG. 2A, when the lock-up clutch 66 separates from the inside wall surface of the front cover 60, that is, when the engagement action of the lock-up clutch 66 is not being performed, as shown by the arrow mark K, the working oil flows and the turbine runner 63 rotates pulled along by rotation of the pump impeller 62. That is, at this time, the output shaft of the engine is fluidly coupled with the input shaft 61 of the transmission 28 whereby the input shaft 61 of the transmission 28 is made to rotate. On the other hand, as shown in FIG. 2B, when the lock-up clutch 66 is made to press against the inside wall surface of the front cover 60, that is, when the engagement action of the lock-up clutch 66 is being performed, the rotational force of the front cover 60 is transmitted through the lock-up clutch 66 to the input shaft 61 of the transmission 28. That is, at this time, the output shaft of the engine is mechanically coupled by the input shaft 61 of the transmission 28.

Note that, as shown in FIG. 2B, the engaged states of the lock-up clutch 66 when the engagement action of the lock-up clutch 66 is being performed include two engaged states. One is when the lock-up clutch 66 is made to press against the inside wall surface of the front cover 60 without sliding, that is, when the lock-up clutch 66 is completely coupled with the inside wall surface of the front cover 60. At this time, the front cover 60, pump impeller 62, turbine runner 63, and input shaft 61 of the transmission 28 rotate together. The engaged state of the lock-up clutch 66 when the lock-up clutch 66 is completely coupled with the inside wall surface of the front cover 60 will be referred to below as "non-sliding engagement".

The other is when the lock-up clutch 66 is made to press against the inside wall surface of the front cover 60 while sliding. At this time, the rotational force of the front cover 60 is on the one hand transmitted through the lock-up clutch 66 to the input shaft 61 of the transmission 28 while on the other hand is transmitted through the fluid coupling between the pump impeller 62 and the turbine runner 63 to the input shaft 61 of the transmission 28. At this time, the rotational speed of the input shaft 61 of the transmission 28 becomes slower than the rotational speed of the output shaft of the engine. The engaged state of the lock-up clutch 66 when the lock-up clutch 66 is made to press against the inside wall surface of the front cover 60 while sliding in this way will be referred to below as "sliding engagement" or "flex lock-up". In this case, the engaged state of the lock-up clutch 66 can be freely controlled by changing the duty ratio of the drive pulse which is applied to the solenoid of the pressure control device 67.

Figure 3:
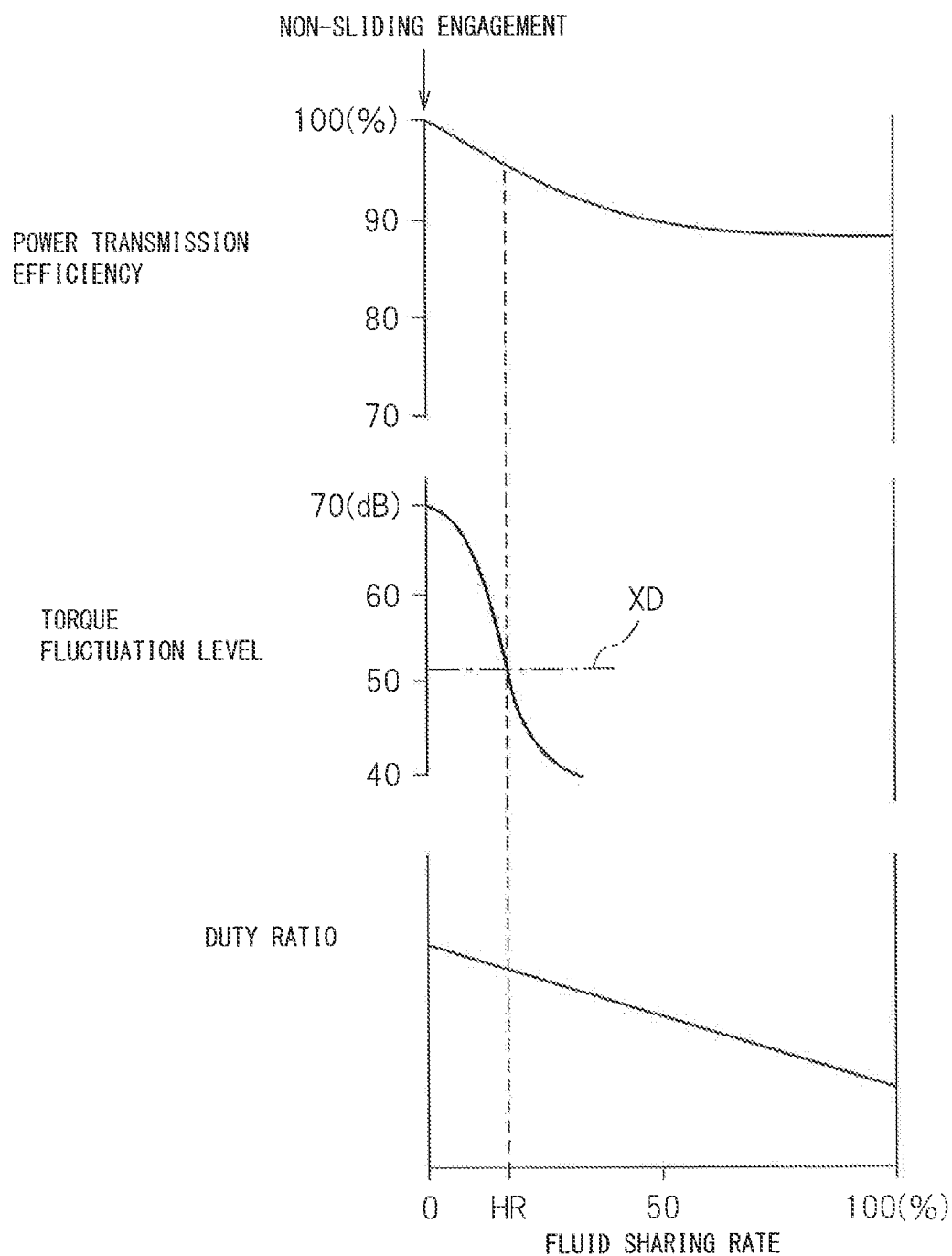
FIG. 3 is a view which shows a power transmission efficiency etc of a torque converter.

FIG. 3 shows the relationship of the power transmission efficiency of the torque converter 27, the torque fluctuation level of the input shaft 61 of the transmission 28, the duty ratio of the drive pulse which is applied to the solenoid of the pressure control device 67, and the fluid sharing ratio at power transmission of the torque converter 27 (=power which is transmitted due to fluid coupling/total transmitted power). Saying that this fluid sharing ratio is 0(%) means that all of the power is mechanically transmitted, that is, the lock-up clutch 66 is engaged by non-sliding engagement. As opposed to this, saying that the fluid sharing ratio is 100(%) means that all of the power is fluidly transmitted, that is, the lock-up clutch 66 is not engaged. Further, saying that the fluid sharing ratio is neither 0(%) nor 100(%) means that part of the power is mechanically transmitted and part of the power is fluidly transmitted, that is, the lock-up clutch 66 is engaged by sliding engagement.

As shown in FIG. 3, the power transmission efficiency of the torque converter 27 is 100(%) when the fluid sharing ratio is 0(%), that is, when the lock-up clutch 66 is engaged by non-sliding engagement. The power transmission efficiency of the torque converter 27 falls along with an increase of the fluid sharing ratio. On the other hand, FIG. 3 shows the change of the torque fluctuation level of the input shaft 61 of the transmission 28. Note that, this torque fluctuation level shows the ratio of the actual vibration acceleration with respect to the reference vibration acceleration. The torque fluctuation level of the input shaft 61 of the transmission 28 which is shown in FIG. 3 is shown with reference to the example of when the torque fluctuation level of the engine output is 70(dB). As will be understood from FIG. 3, the torque fluctuation level of the input shaft 61 of the transmission 28 rapidly falls if the fluid sharing ratio increases. Note that, in the embodiment according to the present invention, the engaged state of the lock-up clutch 66 is controlled by changing the duty ratio of the drive pulse which is applied to the solenoid of the pressure control device 67. In the example which is shown in FIG. 3, the larger the duty ratio of the drive pulse which is applied to the solenoid of the pressure control device 67 is made, the stronger the degree of engagement of the lock-up clutch 66.

In this regard, if the output torque of the engine fluctuates and due to this the input shaft 61 of the transmission 28 suffers from torque fluctuation, the drive force of the vehicle fluctuates. At this time, the fact that torque fluctuation has occurred is felt by a passenger. In this case, if the lock-up clutch 66 is switched from the non-sliding engaged state to the sliding engaged state, the torque fluctuation which occurs at the input shaft 61 of the transmission 28 becomes smaller, therefore the level of the torque fluctuation which is transmitted to the passenger becomes small. Note that, in this case, if the torque fluctuation level of the input shaft 61 of the transmission 28 is low, a passenger will never particularly be given an uncomfortable feeling, but if the torque fluctuation level of the input shaft 61 of the transmission 28 becomes larger, a passenger is given an uncomfortable feeling. The torque fluctuation level XD in FIG. 3 shows the boundary value of the torque fluctuation level which gives an uncomfortable feeling to a passenger. If the torque fluctuation level of the input shaft 61 of the transmission 28 becomes lower than this boundary torque fluctuation level XD, a passenger is no longer given an uncomfortable feeling. That is, if the fluid sharing ratio is made lower than the fluid sharing ratio HR by which the torque fluctuation level of the input shaft 61 of the transmission 28 becomes the boundary torque fluctuation level XD, a passenger will not be given an uncomfortable feeling. This torque fluctuation level XD is found in advance by experiments.

Figure 4:
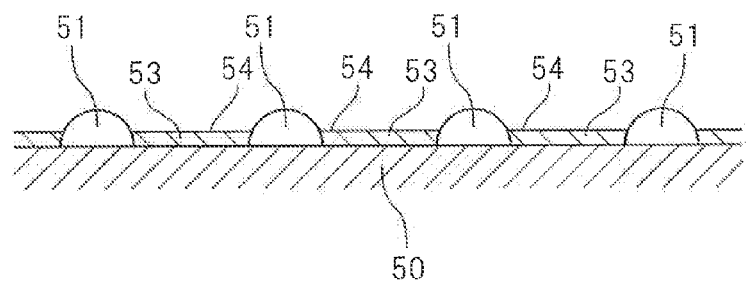
FIG. 4 is a view which schematically shows the surface part of a catalyst carrier.

Next, the exhaust purification catalyst 13 shown in FIG. 1 will be explained with reference to FIG. 4. FIG. 4 schematically shows a surface part of a catalyst carrier which is carried on a substrate of the exhaust purification catalyst 13 shown in FIG. 1. At this exhaust purification catalyst 13, as shown in FIG. 4, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 5:
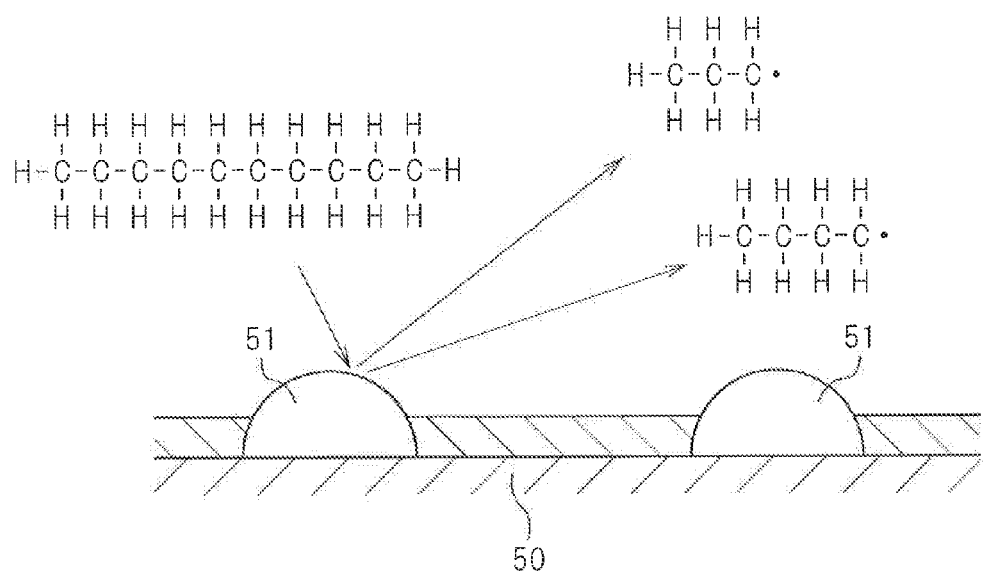
FIG. 5 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 5 schematically shows the reformation action performed at the exhaust purification catalyst 13 at this time. As shown in FIG. 5, the hydrocarbons HC which are injected from the hydrocarbon feed valve 15 become radical hydrocarbons HC with a small carbon number due to the precious metal catalyst 51.

Figure 6:
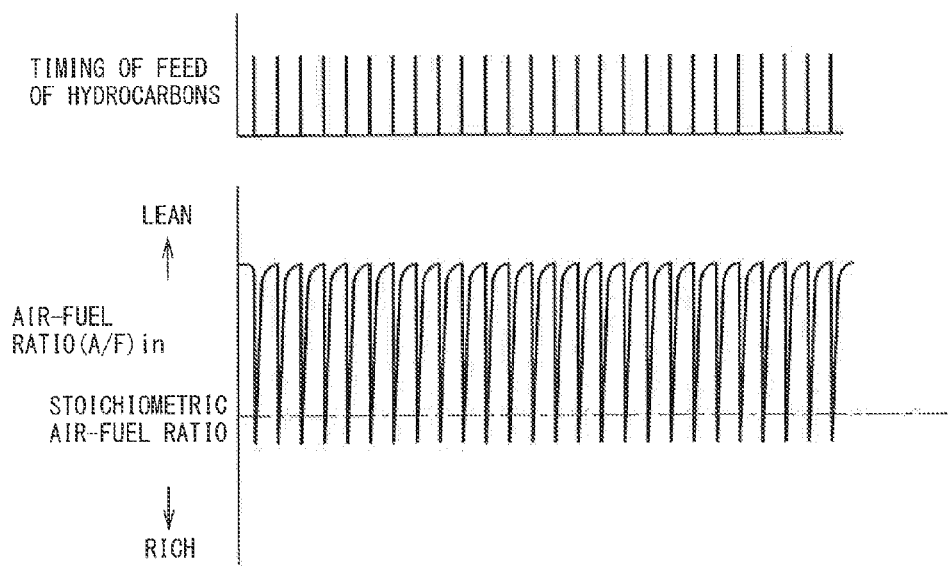
FIG. 6 is a view which shows changes in an air-fuel ratio of exhaust gas which flows into an exhaust purification catalyst.

FIG. 6 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 6 expresses the change in concentration of the hydrocarbons. However, if the hydrocarbon concentration becomes higher, the air-fuel ratio (A/F) in becomes smaller, so, in FIG. 6, the more to the rich side the air-fuel ratio (A/F) in becomes, the higher the hydrocarbon concentration.

Figure 7:
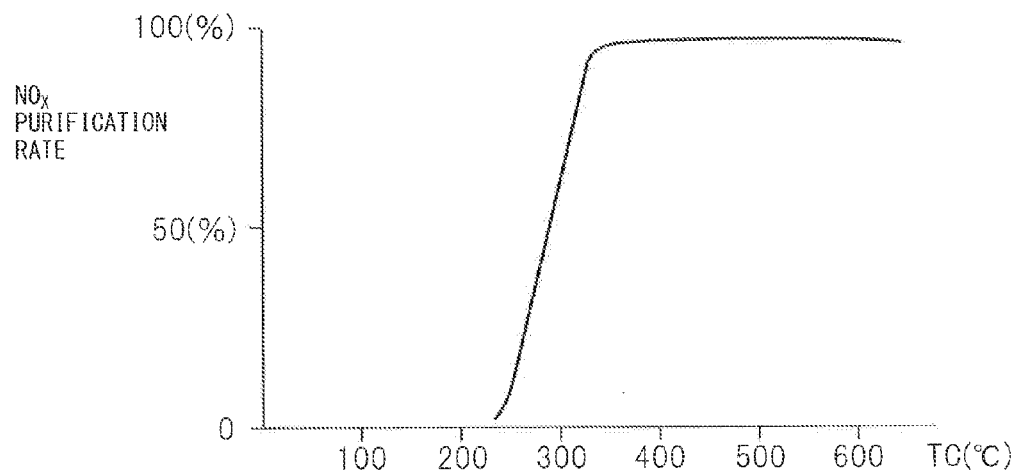
FIG. 7 is a view which shows an $NO_X$ purification rate.

FIG. 7 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 6, periodically make the air-fuel ratio (A/F) in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate by within a predetermined range of amplitude and within a predetermined range of period, as shown in FIG. 7, an extremely high $NO_X$ purification rate is obtained even in a 400° C. or higher high temperature region.

Figure 8A:
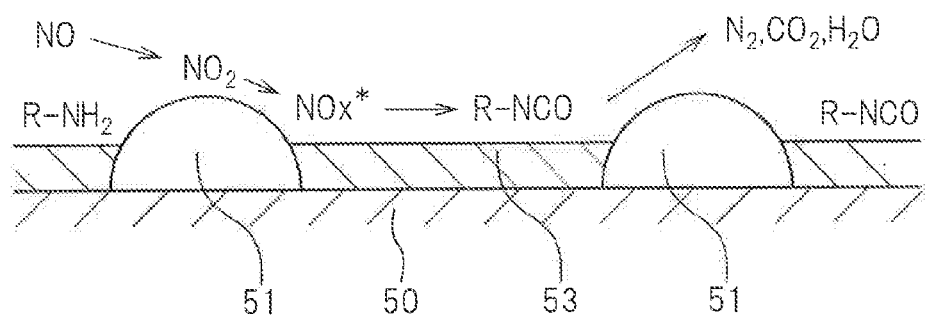
FIGS. 8A and 8B are views for explaining an oxidation reduction reaction in an exhaust purification catalyst.
Figure 8B:
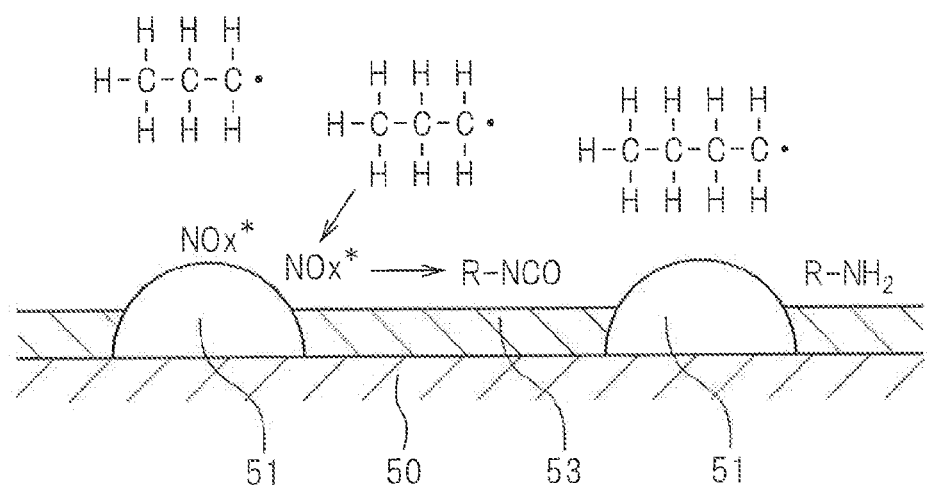

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate. Next, this will be explained with reference to FIGS. 8A and 8B. Note that, these FIGS. 8A and 8B schematically show the surface part of the catalyst carrier 50 of the exhaust purification catalyst 13. These FIGS. 8A and 8B show the reaction which is presumed to occur when the concentration of hydrocarbons which flow into the exhaust purification catalyst 13 is made to vibrate within a predetermined range of amplitude and within a predetermined range of period.

FIG. 8A shows when the concentration of hydrocarbons which flow into the exhaust purification catalyst 13 is low, while FIG. 8B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 6, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 8A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_{X+}$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 5. Therefore, as shown in FIG. 8B, the hydrogen concentration around the active $NO_{X+}$ becomes higher. In this regard, if, after the active $NO_{X+}$ is produced, the state of a high oxygen concentration around the active $NO_{X+}$ continues for a constant time or more, the active $NO_{X+}$ is oxidized and is absorbed in the form of nitrate ions $NO_3^-$ inside the basic layer 53. However, if, before this constant time elapses, the hydrocarbon concentration around the active $NO_{X+}$ becomes higher, as shown in FIG. 8B, the active $NO_{X+}$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 8B, the majority of the reducing intermediates which are held or adsorbed on the surface of the basic layer 53 is believed to be the isocyanate compound R—NCO and amine compound R—$NH_2$.

On the other hand, as shown in FIG. 8B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_X$ in the exhaust gas, react with the active $NO_{X+}$, react with the surrounding oxygen, or break down on their own. Due to this, the reducing intermediates R—NCO and R—$NH_2$ are converted to $N_2$, $CO_2$, and $H_2O$ as shown in FIG. 8A, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_X$ in the exhaust gas or the active $NO_{X+}$ or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas or the active $NO_{X+}$ or oxygen or break down on their own. That is, it is necessary to make the concentration of hydrocarbons which flow into the exhaust purification catalyst 13 vibrate within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas or the active $NO_{X+}$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_{X+}$ is absorbed in the basic layer 53 in the form of nitrates without producing reducing intermediates. To avoid this, it is necessary to make the concentration of hydrocarbons which flow into the exhaust purification catalyst 13 vibrate within a predetermined range of period.

Therefore, in the embodiment according to the present invention, to react the $NO_X$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 6, the injection interval is made 3 seconds.

Figure 9A:
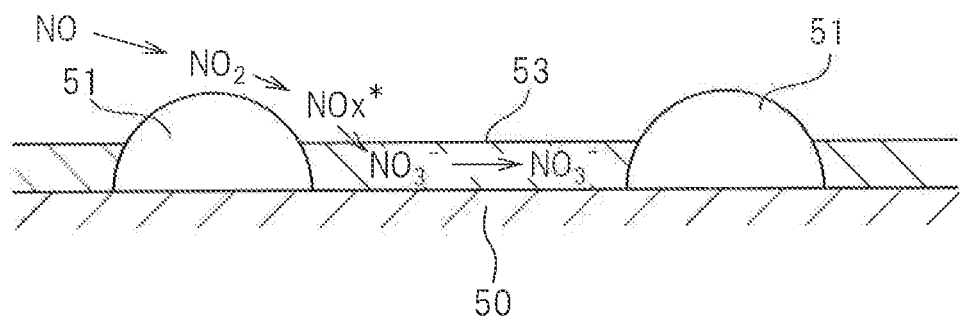
FIGS. 9A and 9B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_{X+}$ which is produced on the platinum Pt 53, as shown in FIG. 9A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 9B:
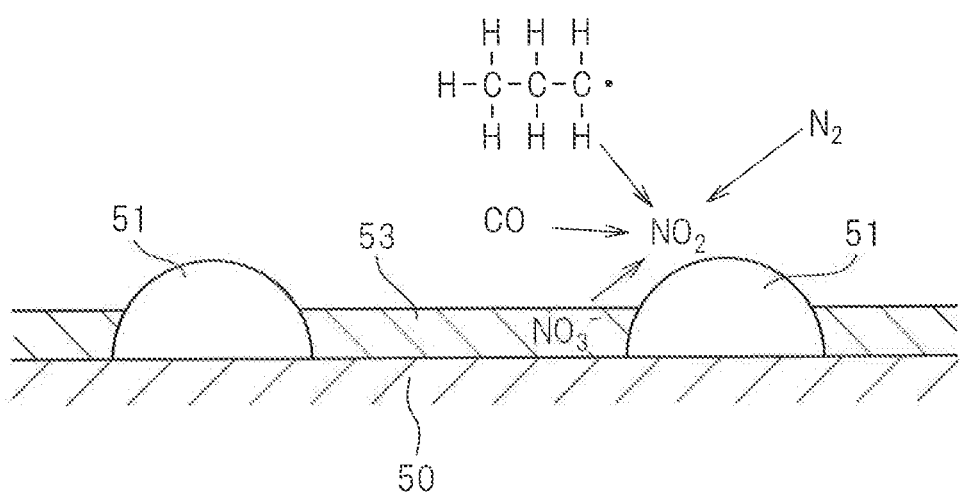

On the other hand, FIG. 9B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 9B, are released from the basic layer 53 in the form of $NO_2$. Next, the released $NO_2$ is reduced by the hydrocarbons HC and CO contained in the exhaust gas.

Figure 10:
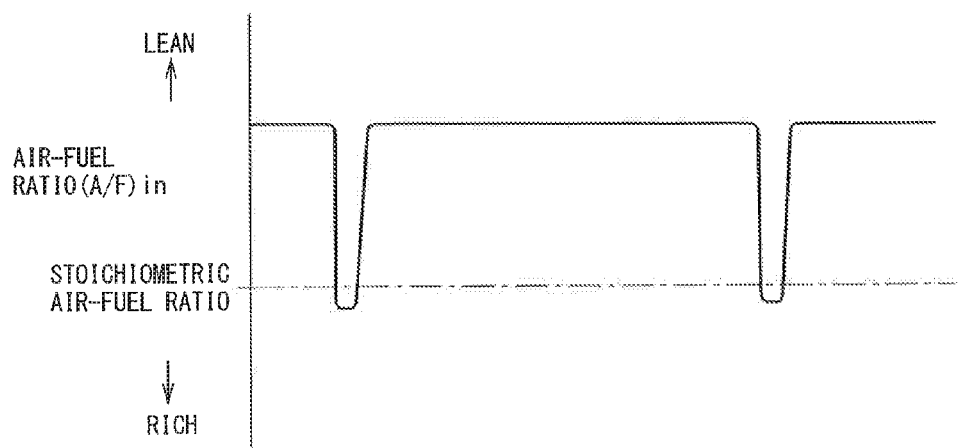
FIG. 10 is a view which shows changes in an air-fuel ratio of exhaust gas which flows into an exhaust purification catalyst.

FIG. 10 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 10, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 11:
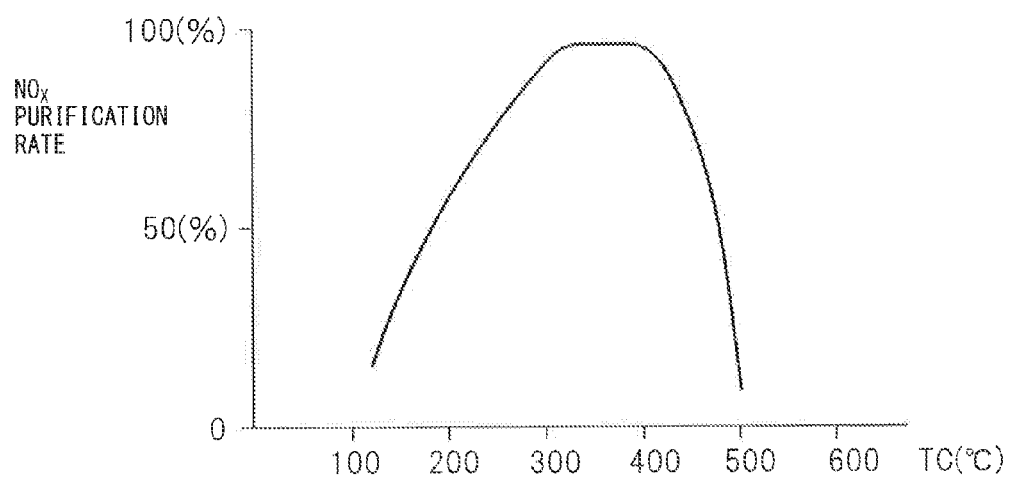
FIG. 11 is a view which shows an $NO_X$ purification rate.

FIG. 11 shows the $NO_X$ purification rate when making the exhaust purification catalyst 13 function as an $NO_X$ storage catalyst in this way. Note that, the abscissa of the FIG. 1 shows the catalyst temperature TC of the exhaust purification catalyst 13. When making the exhaust purification catalyst 13 function as an $NO_X$ storage catalyst, as shown in FIG. 11, when the catalyst temperature TC is 300° C. to 400° C., an extremely high $NO_X$ purification rate is obtained, but when the catalyst temperature TC becomes a 400° C. or higher high temperature, the $NO_X$ purification rate falls.

In this way, when the catalyst temperature TC becomes 400° C. or more, the $NO_X$ purification rate fails because if the catalyst temperature TC becomes 400° C. or more, the nitrates break down by heat and are released in the form of $NO_2$ from the exhaust purification catalyst 2. That is, so long as storing $NO_X$ in the form of nitrates, when the catalyst temperature TC is high, it is difficult to obtain a high $NO_X$ purification rate. However, in the new $NO_X$ purification method shown from FIG. 6 to FIGS. 8A and 8B, as will be understood from FIGS. 8A and 8B, nitrates are not formed or even if formed are extremely fine in amount, and consequently, as shown in FIG. 7, even when the catalyst temperature TC is high, a high $NO_X$ purification rate is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, basic exhaust gas flow surface parts 54 are formed around the precious metal catalysts 51, the exhaust purification catalyst 13 has the property of reducing the $NO_X$ which is contained in exhaust gas if the concentration of hydrocarbons which flow into the exhaust purification catalyst 13 is made to vibrate within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is, the $NO_X$ purification method which is shown from FIG. 6 to FIGS. 8A and 8B can be said to be a new $NO_X$ purification method designed to remove $NO_X$ without forming so much nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become smaller in amount compared with the case where making the exhaust purification catalyst 13 function as an $NO_X$ storage catalyst. Note that, this new $NO_X$ purification method will be referred to below as the "first $NO_X$ removal method".

Figure 12:
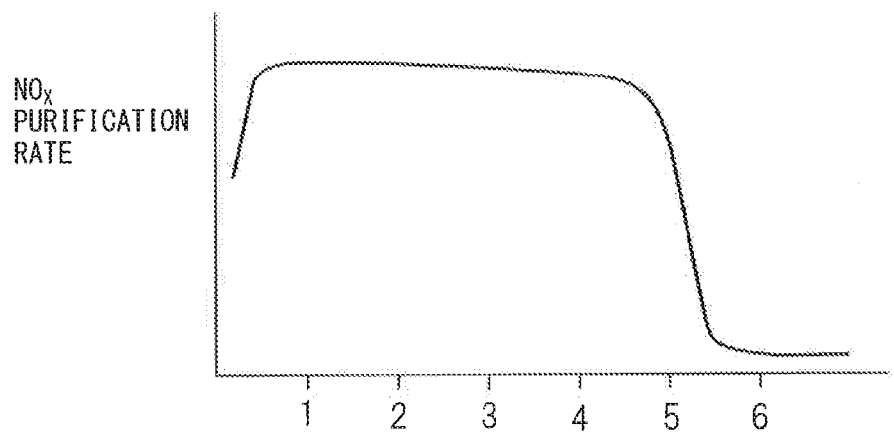
FIG. 12 is a view which shows a relationship between a vibration period ΔT of hydrocarbon concentration and an $NO_X$ purification rate.

Now, as mentioned before, if the injection period ΔT of the hydrocarbons from the hydrocarbon feed valve 15 becomes longer, the time period in which the oxygen concentration around the active $NO_X$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_X^*$ starts to be absorbed in the form of nitrates inside the basic layer 53. Therefore, as shown in FIG. 12, if the vibration period $\Delta T$ of the hydrocarbon concentration becomes longer than about 5 seconds, the $NO_X$ purification rate falls. Therefore, in the embodiment shown in FIG. 1, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 12, if the injection period $\Delta T$ of the hydrocarbons becomes about 0.3 second or less, the $NO_X$ purification rate falls. Therefore, in the embodiment according to the present invention, the injection period of the hydrocarbons is made from 0.3 second to 5 seconds.

Figure 13A:
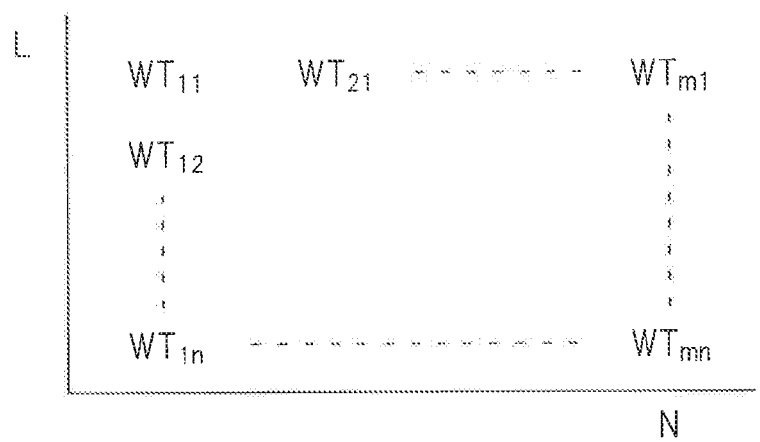
FIGS. 13A and 13B are views which show a map of the injection amount of hydrocarbons etc.
Figure 13B:
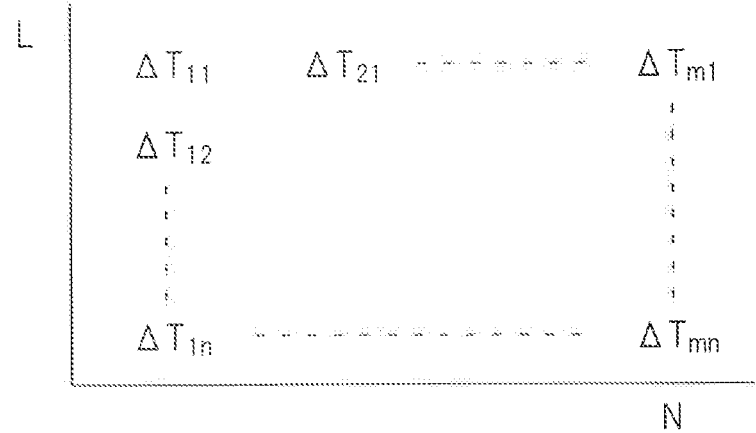

Now, in the embodiment according to the present invention, by controlling the injection amount and injection timing of hydrocarbons from the hydrocarbon feed valve 15, the air-fuel ratio (A/F) in of the exhaust gas flowing into the exhaust purification catalyst 13 and the injection period $\Delta T$ of the hydrocarbons are controlled so as to become the optimal values for the engine operating state. In this case, in the embodiment according to the present invention, the optimum hydrocarbon injection amount WT when the $NO_X$ purification action by the first $NO_X$ purification method is performed while performing an exhaust gas recirculating operation by the low pressure exhaust gas recirculation system LPL is stored as a function of the amount of depression L of the accelerator pedal 40 and the engine speed N in the form of a map such as shown in FIG. 13A in advance in the ROM 32. Further, the optimum injection period $\Delta T$ of the hydrocarbons at this time is also stored as a function of the amount of depression L of the accelerator pedal 40 and the engine speed N in the form of a map such as shown in FIG. 13B in advance in the ROM 32. Similarly, the optimum hydrocarbon injection amount WT and injection period $\Delta T$ when the $NO_X$ purification action by the first $NO_X$ purification method is performed while performing an exhaust gas recirculating operation by the high pressure exhaust gas recirculation system HPL is stored as a function of the amount of depression L of the accelerator pedal 40 and the engine speed N in advance in the ROM 32.

Next, referring to FIG. 14 to FIG. 17, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ removal method".

Figure 14:
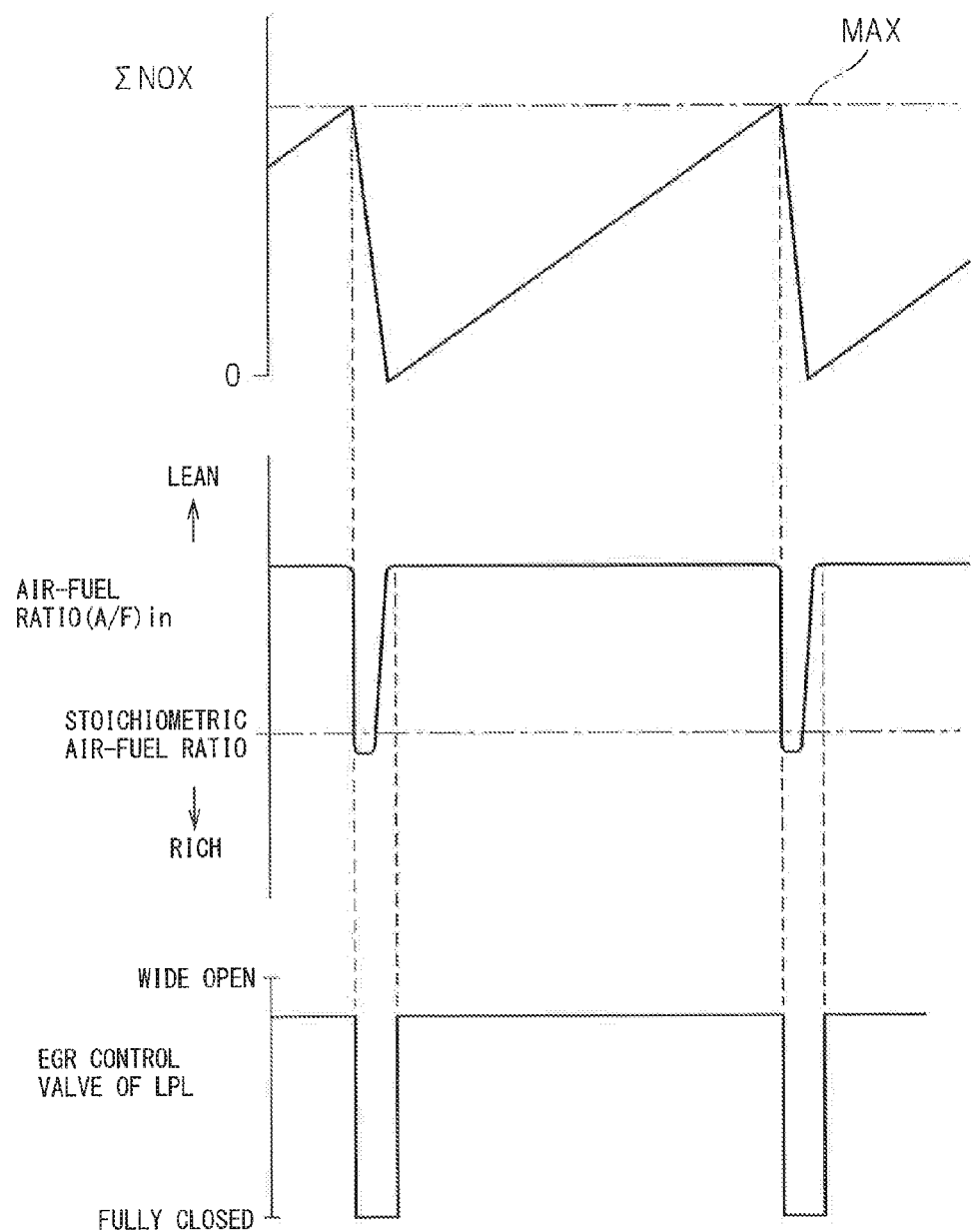
FIG. 14 is a view which shows an $NO_X$ release control.

In this second $NO_X$ removal method, as shown in FIG. 14, when the stored $NO_X$ amount $\Sigma NO_X$ of $NO_X$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F in of the exhaust gas is made rich, the $NO_X$ which was stored in the basic layer 53 when the air-fuel ratio (A/F) in of the exhaust gas was lean is released from the basic layer 53 all at once and reduced. Due to this, the $NO_X$ is removed.

Figure 25:
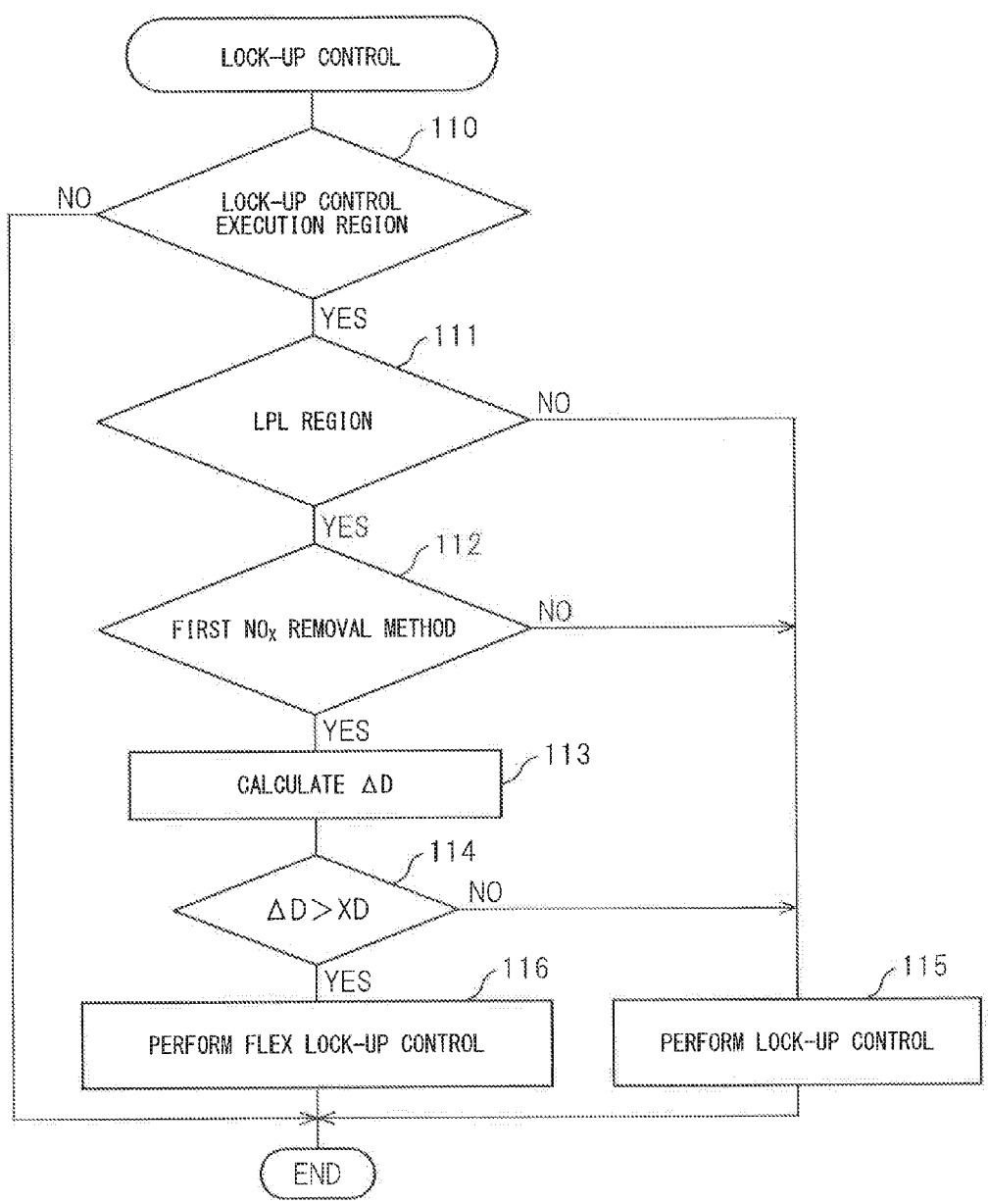
FIG. 25 is a flow chart of a still further embodiment for performing a lock-up control.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the amount of depression L of the accelerator pedal 40 and the engine speed N in the form of a map such as shown in FIG. 25 in advance in the ROM 32. The stored $NO_X$ amount $\Sigma NO_X$ is calculated from this exhausted $NO_X$ amount NOXA. In this case, as explained before, the period at which the air-fuel ratio (A/F) in of the exhaust gas is made rich is usually 1 minute or more.

Figure 16:
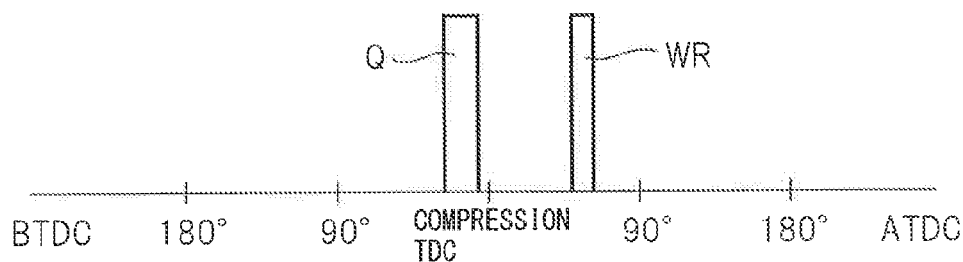
FIG. 16 is a view which shows a fuel injection timing.
Figure 17:
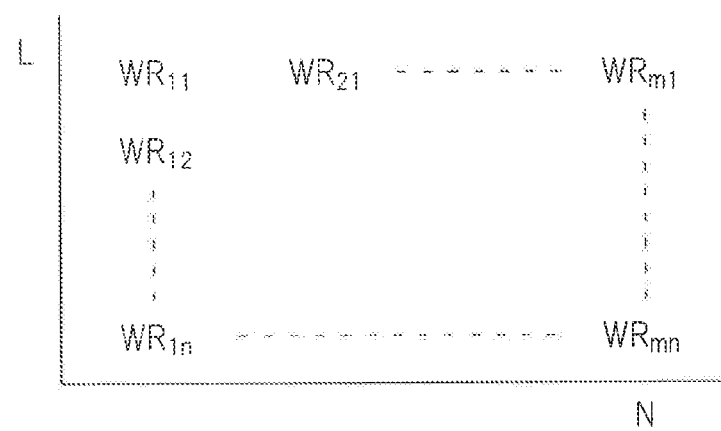
FIG. 17 is a view which shows a map of an additional hydrocarbon feed amount WR.

In this second $NO_X$ removal method, as shown in FIG. 16, by injecting an additional fuel WR into each combustion chamber 2 from the fuel injector 3 in addition to the combustion-use fuel Q, the air-fuel ratio (A/F) in of the exhaust gas which flows into the exhaust purification catalyst 13 is made rich. Note that, in FIG. 16, the abscissa indicates the crank angle. This additional fuel WP is injected at a timing at which it will burn, but will not appear as engine output, that is, slightly before ATDC90° after compression top dead center. This fuel amount WR is stored as a function of the amount of depression L of the accelerator pedal 40 and the engine speed N in the form of a map such as shown in FIG. 17 in advance in the ROM 32. Of course, in this case, the air-fuel ratio (A/F) in of the exhaust gas flowing into the exhaust purification catalyst 13 may be made rich by increasing an injection amount of hydrocarbons from the hydrocarbon feed valve 15.

Next, referring to FIG. 18, an $NO_X$ removal control routine will be explained. Note that, this routine is executed by interruption every fixed time interval.

Figure 18:
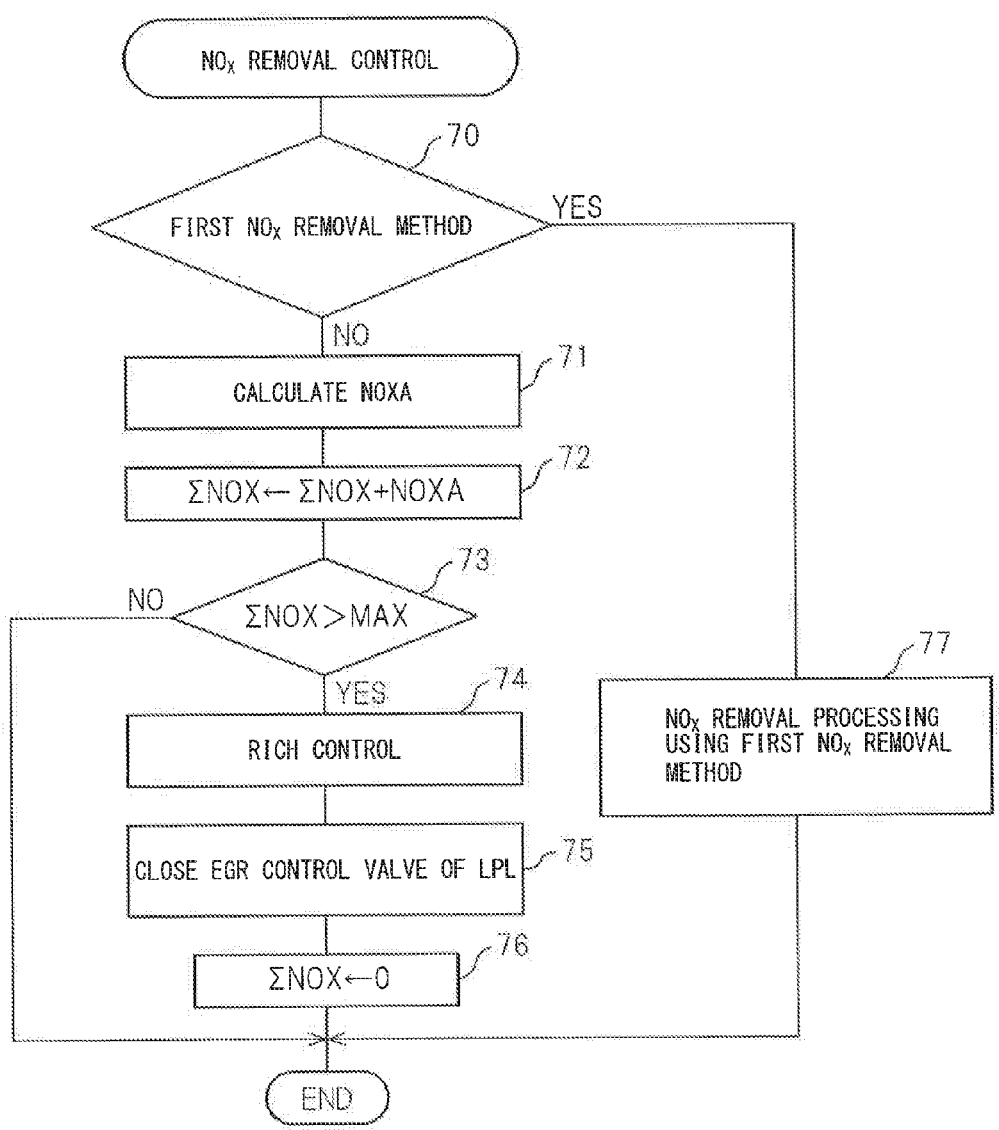
FIG. 18 is a flow chart for performing an $NO_X$ purification control.

If referring to FIG. 18, first, at step 70, it is judged if the engine operating state is an operating state where the $NO_X$ removal action by the first $NO_X$ removal method should be performed. Note that, the operating state of the engine where the $NO_X$ removal action by the first $NO_X$ removal method is performed is determined in advance. When the engine operating state is not an operating state where the $NO_X$ removal action by the first $NO_X$ removal method should be performed, the routine proceeds to step 71 where an $NO_X$ removal action by the second $NO_X$ removal method is performed.

Figure 15:
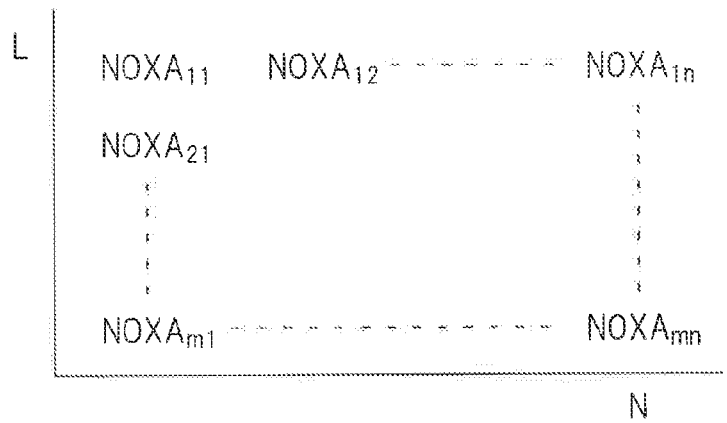
FIG. 15 is a view which shows a map of an exhausted $NO_X$ amount NOXA.

That is, at step 71, the exhaust $NO_X$ amount NOXA per unit time is calculated from the map which is shown in FIG. 15. Next, at step 72, the exhaust $NO_X$ amount NOXA is added to $\Sigma NOX$ to calculate the stored $NO_X$ amount $\Sigma NOX$. Next, at step 73, it is judged if the stored $NO_X$ amount $\Sigma NOX$ exceeds the allowable value MAX. If $\Sigma NOX$>MAX, the routine proceeds to step 74 where the additional amount of fuel WR is calculated from the map which is shown in FIG. 17 and an action of injection of additional fuel is the exhaust gas flowing into the exhaust purification catalyst 13 is made rich. Next, at step 75, when the low pressure exhaust gas recirculation system LPL is used to perform the recirculation action of the exhaust gas, the EGR control valve 24 is made to close. Next, at step 76, $\Sigma NOX$ is cleared.

That is, if the air-fuel ratio (A/F) in of the exhaust gas flowing into the exhaust purification catalyst 13 is made rich to remove the $NO_X$ from the exhaust purification catalyst 13, part of the hydrocarbons slip through the exhaust purification catalyst 13. At this time, if using the low pressure exhaust gas recirculation system LPL to recirculate the exhaust gas, the hydrocarbons which slipped through the exhaust purification catalyst 13 are recirculated by the low pressure exhaust gas recirculation system LPL to the inside of the combustion chamber 2. As a result, the air-fuel ratio in the combustion chamber 2 falls and the output torque of the engine fluctuates. Therefore, to prevent the hydrocarbons which slip through the exhaust purification catalyst 13 from being recirculated to the inside of the combustion chamber 2, the EGR control valve 24 is made to close while hydrocarbons are slipping through from the exhaust purification catalyst 13.

On the other hand, when it is judged at step 70 that the engine operating state is an operating state where the $NO_X$ removal action by the first $NO_X$ removal method should be performed, the routine proceeds to step 77 where the $NO_X$ removal processing by the first $NO_X$ removal method is performed. For example, if, at this time, the low pressure exhaust gas recirculation system LPL is used for recirculation of exhaust gas, the hydrocarbon feed valve 15 injects hydrocarbons of the injection amount WT which is shown in FIG. 13A by the injection period $\Delta T$ which is shown in FIG. 13B. In this way, in the embodiment according to the present invention, a first $NO_X$ removal method which injects hydrocarbons from the hydrocarbon feed valve 13 within the predetermined range of period to thereby remove $NO_X$ which is contained in exhaust gas and a second $NO_X$ removal method which makes an air-fuel ratio of the exhaust gas flowing into the exhaust purification catalyst 13 rich by a period longer than the predetermined range of period to thereby release stored $NO_X$ from the exhaust purification catalyst 13 to remove $NO_X$ are selectively used. When the $NO_X$ removal action by the second $NO_X$ removal method is being performed in the state where the exhaust gas recirculation action by the low pressure exhaust gas recirculation system LPL is being performed, if the air-fuel ratio of the exhaust gas flowing into the exhaust purification catalyst 13 is made rich to release the stored $NO_X$ from the exhaust purification catalyst 13, the exhaust gas recirculation action by the low pressure exhaust gas recirculation system LPL is temporarily stopped.

Now, the temperature of the exhaust gas which flows out from the exhaust purification catalyst 13 and the particulate filter 14 to the inside of the exhaust pipe 12b is considerably lower than the temperature of the exhaust gas which is exhausted to the inside of the exhaust manifold 5. Therefore, the temperature of the exhaust gas which is recirculated by the low pressure exhaust gas recirculation system LPL to the inside of the combustion chamber 2 becomes considerably lower than the temperature of the exhaust gas which is recirculated by the high pressure exhaust gas recirculation system HPL to the inside of the combustion chamber 2. Therefore, when the low pressure exhaust gas recirculation system LPL is used to recirculate the exhaust gas, compared with when the high pressure exhaust gas recirculation system HPL is used to recirculate the exhaust gas, the combustion temperature inside the combustion chamber 2 falls and the amount of generation of $NO_X$ in the combustion chamber 2 falls. That is, when using the low pressure exhaust gas recirculation system LPL to recirculate the exhaust gas, compared with when using the high pressure exhaust gas recirculation system HPL to recirculate the exhaust gas, the amount of $NO_X$ which is exhausted from the combustion chamber 2 can be reduced.

Therefore, in the embodiment according to the present invention, as much as possible, the low pressure exhaust gas recirculation system LPL is used to perform the recirculation action of the exhaust gas. Only when use of the high pressure exhaust gas recirculation system HPL would be preferable to use of the low pressure exhaust gas recirculation system LPL, the high pressure exhaust gas recirculation system HPL is used. Therefore, in this embodiment according to the present invention, when the $NO_X$ removal action by the first $NO_X$ removal method is being performed, sometimes the low pressure exhaust gas recirculation system LPL is used to recirculate the exhaust gas, and when the $NO_X$ removal action by the first $NO_X$ removal method is being performed, sometimes the high pressure exhaust gas recirculation system HPL is used to recirculate the exhaust gas. In this regard, in the former case, that is, when the $NO_X$ removal action by the first $NO_X$ removal method is being performed, if the low pressure exhaust gas recirculation system LPL is used to recirculate the exhaust gas, a problem arises. This will be explained with reference to FIG. 19.

Figure 19:
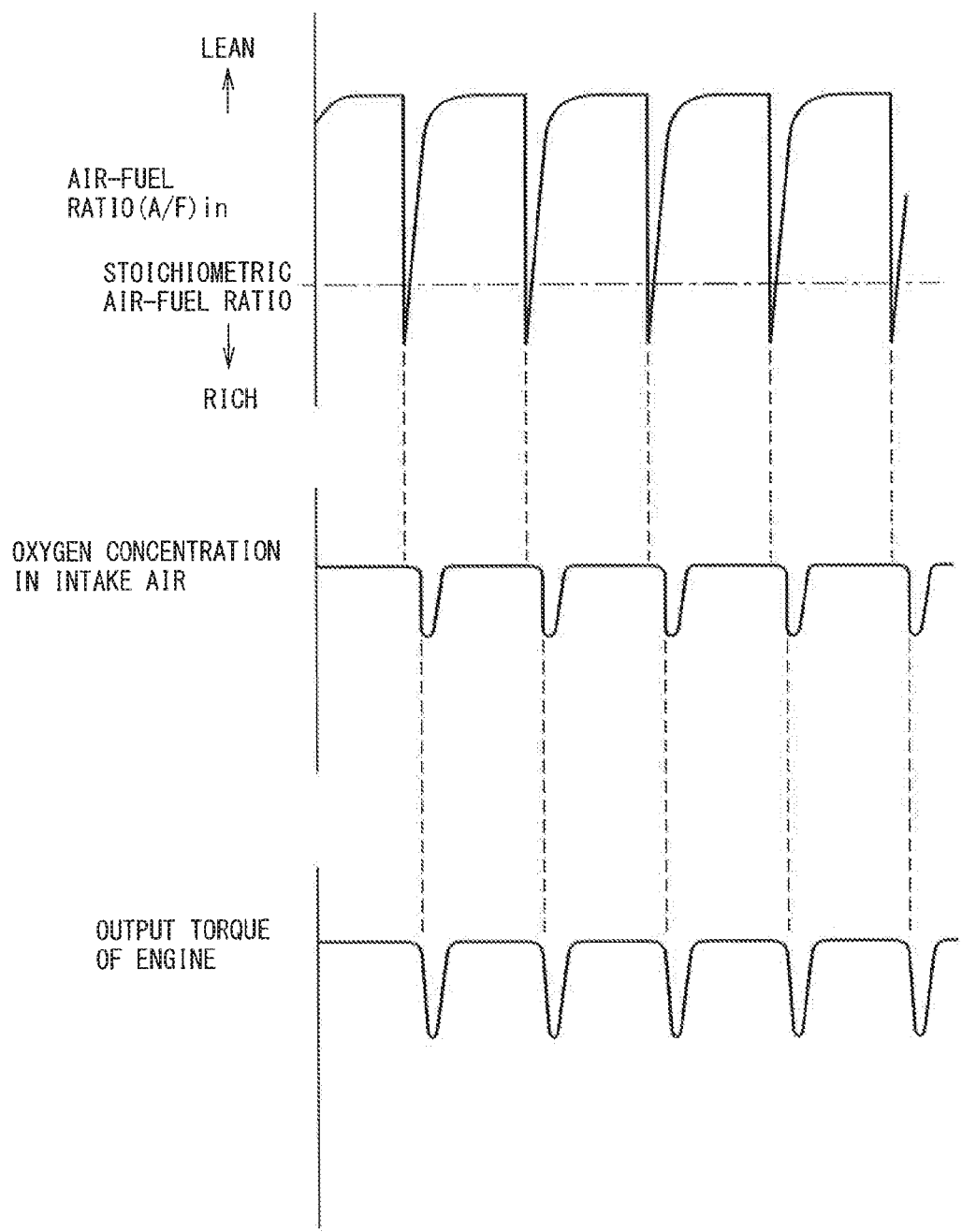
FIG. 19 is a view which shows changes in an air-fuel ratio of exhaust gas which flows into an exhaust purification catalyst etc.

When the $NO_X$ removal action by the first $NO_X$ removal method is being performed, that is, as shown in FIG. 19, when hydrocarbons are injected from the hydrocarbon feed valve 15 by a short period so that the air-fuel ratio (A/F) in of the exhaust gas flowing into the exhaust purification catalyst 13 becomes rich, as explained above, part of the injected hydrocarbons is partially oxidized, but the major part of the hydrocarbons is completely oxidized. Therefore, if hydrocarbons are injected from the hydrocarbon feed valve 15, a large amount of carbon dioxide $CO_2$ is generated at the exhaust purification catalyst 13. At this time, if the exhaust gas recirculation action using the low pressure exhaust gas recirculation system LPL has been performed, a large amount of carbon dioxide $CO_2$ which is generated at the exhaust purification catalyst 13 is recirculated through the EGR passage 23 of the low pressure exhaust gas recirculation system LPL and the intake passages 6a, 6b to the inside of the combustion chamber 2. If in this way a large amount of carbon dioxide $CO_2$ is recirculated to the inside of the combustion chamber 2, as shown in FIG. 19, the concentration of oxygen in the amount of intake air which is fed to the inside of the combustion chamber 2 temporarily decreases and the air-fuel ratio of the combustion gas inside the combustion chamber 2 temporarily falls. As a result, as shown in FIG. 19, the output torque of the engine falls by a short period and therefore the output torque of the engine fluctuates.

In this case, in the same way as the case where an $NO_X$ removal action by the second $NO_X$ removal method is being performed, each time the air-fuel ratio (A/F) in of the exhaust gas which flows into the exhaust purification catalyst 13 is made rich, if closing the EGR control valve 24 of the low pressure exhaust gas recirculation system LPL, the output torque of the engine can be prevented from fluctuating. However, when the $NO_X$ removal action by the first $NO_X$ removal method is being performed, the period by which the air-fuel ratio (A/F) in of the exhaust gas flowing into the exhaust purification catalyst 13 is made rich is extremely short. Closing the EGR control valve 24 of the low pressure exhaust gas recirculation system LPL by such a short period so that carbon dioxide $CO_2$ is prevented from being recirculated to the inside of the combustion chamber 2 is difficult in practice. On the other hand, when the $NO_X$ removal action by the first $NO_X$ removal method is being performed, if stopping the recirculation action of the exhaust gas using the low pressure exhaust gas recirculation system LPL, the carbon dioxide $CO_2$ can be prevented from being recirculated to the combustion chamber 2 and thereby the output torque of the engine can be prevented from fluctuating. However, when the $NO_X$ removal action by the first $NO_X$ removal method is being performed, if stopping the recirculation action of the exhaust gas using the low pressure exhaust gas recirculation system LPL, there is the problem that the amount of $NO_X$ which is exhausted from the engine increases and the $NO_X$ removal rate falls.

As opposed to this, as will be explained with reference to FIG. 3, if the lock-up clutch 66 of the torque converter 27 is switched from the non-sliding engaged state to the sliding engaged state, the level of the torque fluctuation which is transmitted to a passenger can be made smaller. Therefore, in the present invention, when the recirculation action of the exhaust gas using the low pressure exhaust gas recirculation system LPL is being performed and the $NO_X$ removal action by the first $NO_X$ removal method is being performed, the lock-up clutch 66 is prevented from becoming the non-sliding engaged state. On the other hand, when the fluctuation level of the engine output torque is low, even if the lock-up clutch 66 is made the non-sliding engaged state, the level of the torque fluctuation which is transmitted to a passenger becomes lower. Therefore, when the fluctuation level of the engine output torque is low, the lock-up clutch 66 does not have to be switched from the non-sliding engaged state to the sliding engaged state.

Therefore, in the present invention, when the engagement action of the lock-up clutch 66 is not being performed, the output shaft of the engine is fluidly coupled with the input shaft 61 of the transmission 28, and when the engagement action of the lock-up clutch 66 is being performed, the output shaft of the engine is mechanically coupled with the input shaft 61 of the transmission 28. When the engagement action of the lock-up clutch 66 should be performed, if the exhaust gas recirculation action using the low pressure exhaust gas recirculation system LPL is being performed and hydrocarbons are injected from the hydrocarbon feed valve 15 by a predetermined period ΔT, non-sliding engagement of the lock-up clutch 66 is prohibited constantly or in accordance with the magnitude of the torque fluctuation of the engine output.

Figure 20A:
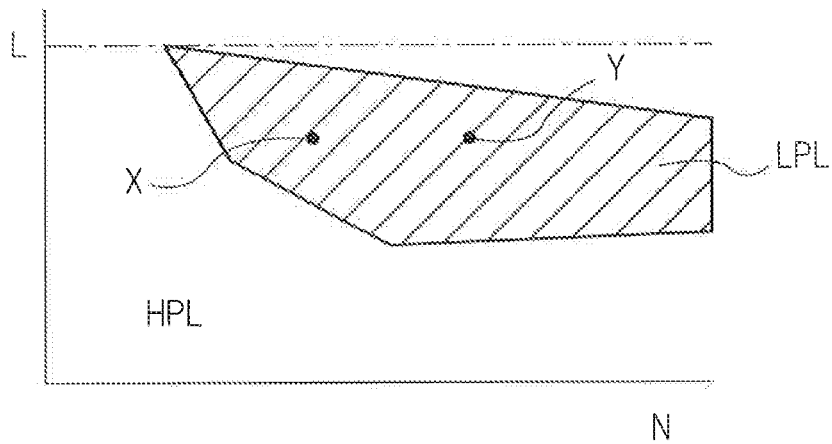
FIGS. 20A, 20B and 20C are views which show an operating region in which an exhaust gas recirculating operation by a plow pressure exhaust gas recirculation system LPL is performed.

Next, referring to FIG. 20A to FIG. 20C, the engine operating state where non-sliding engagement of the lock-up clutch 66 is prohibited will be explained. FIG. 20A shows the operating region of the engine where the recirculation action of the exhaust gas using the low pressure exhaust gas recirculation system LPL is performed and the operating region of the engine where the recirculation action of the exhaust gas using the high pressure exhaust gas recirculation system HPL is performed. The hatching shows the operating region of the engine where the recirculation action of the exhaust gas using the low pressure exhaust gas recirculation system LPL is performed. Note that, in FIG. 20A, the abscissa shows the engine speed N, while the ordinate shows the amount of depression L of the accelerator pedal 40. From FIG. 20A, it will be understood that at the time of engine high load medium-high speed operation, the recirculation action of the exhaust gas using the low pressure exhaust gas recirculation system LPL is performed.

Figure 20B:
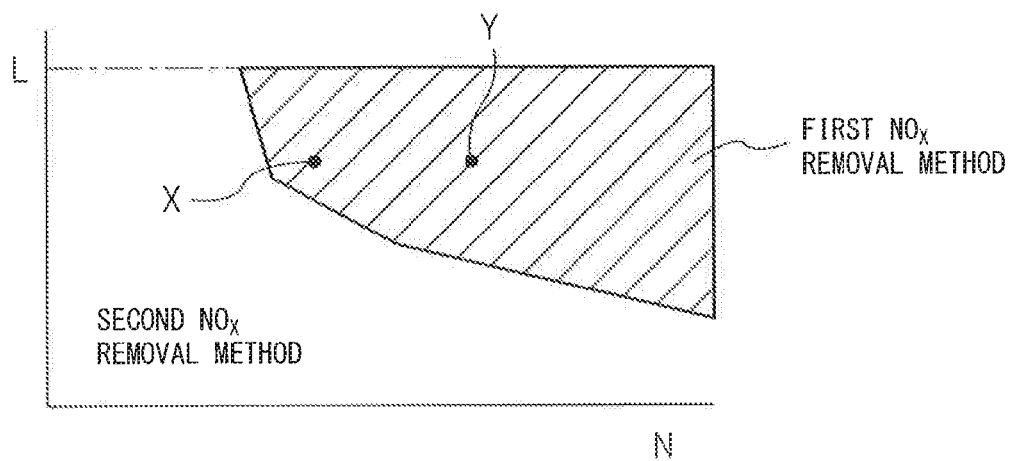

FIG. 20B shows the operating region of the engine where the $NO_X$ removal action by the first $NO_X$ removal method is performed and the operating region of the engine where the $NO_X$ removal action by the second $NO_X$ removal method is performed. The hatching shows the operating region of the engine where the $NO_X$ removal action by the first $NO_X$ removal method is performed. Note that, in FIG. 20B as well, the abscissa shows the engine speed N, while the ordinate shows the amount of depression L of the accelerator pedal 40. From FIG. 20B, it will be understood that the $NO_X$ removal action by the first $NO_X$ removal method is performed at the time of engine nigh load medium-high speed operation.

Figure 20C:
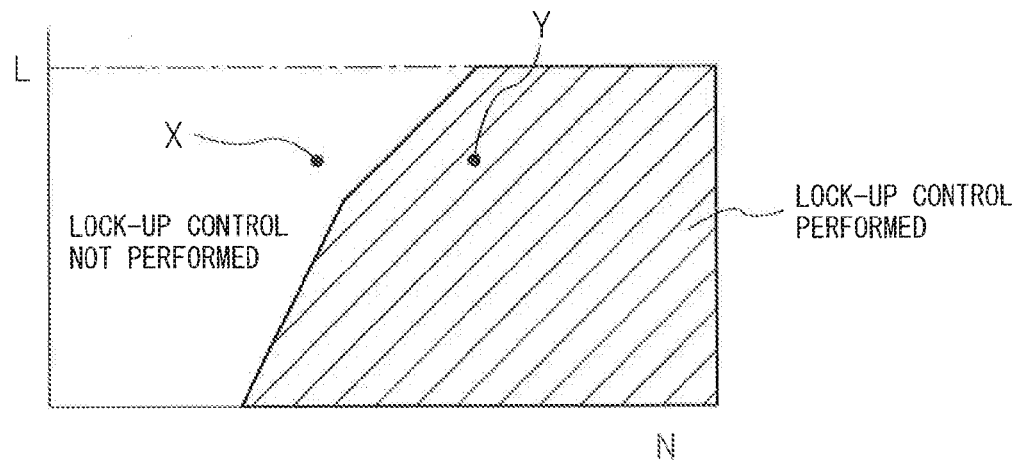

Next, FIG. 20C shows the operating region of the engine when lock-up control is performed and the operating region of the engine when lock-up control is not performed. The hatching shows the operating region of the engine where lock-up control is performed. Note that, in FIG. 20C as well, the abscissa shows the engine speed N, while the ordinate shows the amount of depression L of the accelerator pedal 40. Further, in the example which is shown in FIG. 20C, if lock-up control is performed, the lock-up clutch 66 is disengaged, while when lock-up control is not being performed, the lock-up clutch 66 is made the non-sliding engaged state. Note that, from FIG. 20C, it will be understood that lock-up control is performed at the time of engine medium and high speed operation.

In FIG. 20A to FIG. 20C, when the engine operating state is an operating state which is shown by a black dot X, the recirculation action of the exhaust gas using the low pressure exhaust gas recirculation system LPL is being performed and the $NO_X$ removal action by the first $NO_X$ removal method is being performed. At this time, lock-up control is not being performed. Therefore, at this time, even if the engine output torque fluctuates, this torque fluctuation is not transmitted to a passenger much at all, so no problem at all occurs. On the other hand, when the engine operating state is the operating state which is shown by a black dot Y, lock-up control is performed in the state where the recirculation action of the exhaust gas using the low pressure exhaust gas recirculation system LPL is being performed and the $NO_X$ removal action by the first $NO_X$ removal method is being performed. Therefore, at this time, depending on the level of the torque fluctuation of the engine output, this torque fluctuation is sometimes transmitted to the passengers, so some sort of treatment has to be devised. At this time, in the first embodiment according to the present invention, non-sliding engagement of the lock-up clutch 66 is prohibited.

FIG. 21 shows a lock-up control routine for working this first embodiment. Note that, this routine is executed by interruption every fixed time interval. Referring to FIG. 21, first, at step 80, it is judged if the engine operating state is in the lock-up control execution region which is shown by the hatching in FIG. 20C. When the engine operating state is not in the lock-up control execution region, the processing cycle is ended, while when the engine operating state is in the lock-up control execution region, the routine proceeds to step 81. At step 81, it is judged if the engine operating state is in the LPL region which is shown by the hatching in FIG. 20A. When the engine operating state is in the LPL region, that is, when the recirculation action of the exhaust gas using the low pressure exhaust gas recirculation system LPL is being performed, the routine proceeds to step 82.

At step 82, it is judged if the engine operating state is in the first $NO_X$ removal method region which is shown by the hatching in FIG. 20B. When the engine operating state is in the first $NO_X$ removal method region, that is, when the $NO_X$ removal action by the first $NO_X$ removal method is being performed, the routine proceeds to step 84 where lock-up control is prohibited. At this time, in the first embodiment, the lock-up clutch 66 is prevented from becoming the non-sliding engaged state by the duty ratio of the drive pulse which is applied to the solenoid of the pressure control device 67 being made smaller. As opposed to this, when at step 81 it is judged that the engine operating state is not in the LPL region which is shown by the hatching in FIG. 20A, that is, when the recirculation action of the exhaust gas using the low pressure exhaust gas recirculation system LPL is not being performed, the routine proceeds to step 83, while when at step 82 it is judged that the engine operating state is not the first $NO_X$ removal method region which is shown by the hatching in FIG. 20B, that is, when the $NO_X$ removal action by the first $NO_X$ removal method is not being performed, the routine proceeds to step 83. At step 83, lock-up control is performed. At this time, in the first embodiment, the duty ratio of the drive pulse which is applied to the solenoid of the pressure control, device 67 is made larger and the lock-up clutch 66 is engaged by non-sliding engagement.

Next, a second embodiment which is designed so that even if the output torque of the engine fluctuates, the occurrence of torque fluctuation is prevented from being felt much at all by a passenger will be explained. In this second embodiment, to prevent the occurrence of torque fluctuation from being felt much at all by a passenger even if the output torque of the engine fluctuates, when the recirculation action of the exhaust gas using the low pressure exhaust gas recirculation system LPL is being performed and the $NO_X$ removal action by the first $NO_X$ removal method is being performed, the lock-up clutch 66 is made a state not engaged at all. That is, in this second embodiment, when the engagement action of the lock-up clutch 66 should be performed, if the exhaust gas recirculation action using the low pressure exhaust gas recirculation system LPL is being performed and hydrocarbons are injected from the hydrocarbon feed valve 15 by a predetermined period $\Delta T$, non-sliding engagement of the lock-up clutch 66 and additionally sliding engagement of the lock-up clutch 66 are prohibited. In this case, at step 84 of the lock-up control routine which is shown in FIG. 21, both non-sliding engagement of the lock-up clutch 66 and sliding engagement of the lock-up clutch 66 are prohibited.

Next, a third embodiment which is designed to reduce the level of torque fluctuation which is felt by a passenger when the output torque of the engine fluctuates will be explained. In this third embodiment, to reduce the level of torque fluctuation which is felt by a passenger, when the engagement action of the lock-up clutch 66 should be performed, if the recirculation action of the exhaust gas using the low pressure exhaust gas recirculation system LPL is being performed and the $NO_X$ removal action by the first $NO_X$ removal method is being performed, the lock-up clutch 66 is engaged by sliding engagement. That is, flex lock-up control of the lock-up clutch 66 is performed.

Figure 22:
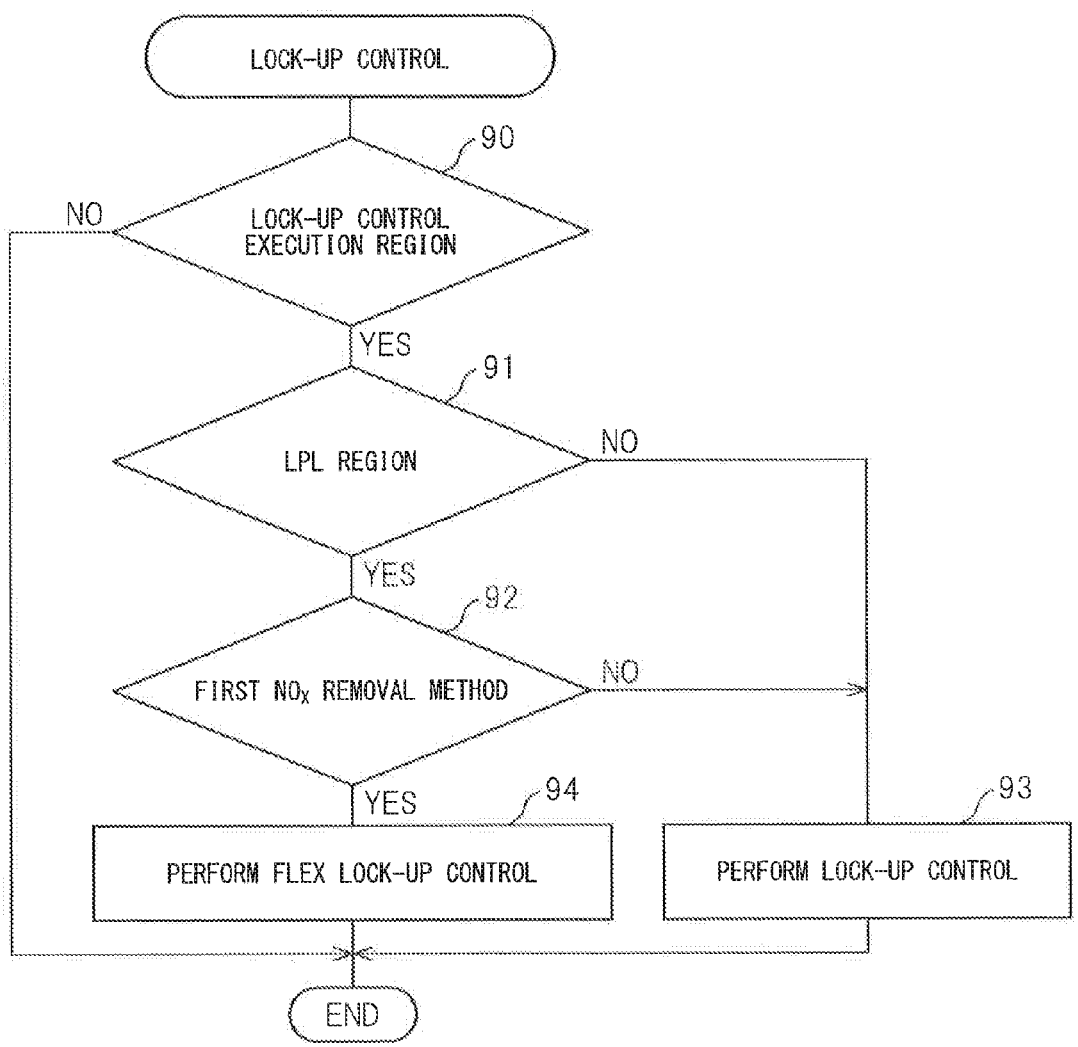
FIG. 22 is a flow chart of a further embodiment for performing a lock-up control.

FIG. 22 shows a lock-up control routine for working this third embodiment. Note that, this routine is executed by interruption every fixed time interval. Referring to FIG. 22, first, at step 90, it is judged if the engine operating state is in the lock-up control execution region which is shown by the hatching in FIG. 20C. When the engine operating state is not in the lock-up control execution region, the processing cycle is ended, while when the engine operating state is in the lock-up control execution region, the routine proceeds to step 91. At step 91, it is judged if the engine operating state is in the LPL region which is shown by the hatching in FIG. 20A. When the engine operating state is in the LPL region, that is, when the recirculation action of the exhaust gas using the low pressure exhaust gas recirculation system LPL is being performed, the routine proceeds to step 92.

At step 92, it is judged if the engine operating state is in the first $NO_X$ removal method region which is shown by the hatching in FIG. 20B. When the engine operating state is in the first $NO_X$ removal method region, that is, when the $NO_X$ removal action by the first $NO_X$ removal method is being performed, the routine proceeds to step 94 where the lock-up clutch 66 is made the sliding engaged state, that is, the flex lock-up state, by control of the duty ratio of the drive pulse which is applied to the solenoid of the pressure control device 67. As opposed to this, when at step 91 it is judged that the engine operating state is not in LPL region which is shown by the hatching in FIG. 20A, that is, when the recirculation action of the exhaust gas using the low pressure exhaust gas recirculation system LPL is not being performed, the routine proceeds to step 93, while when at step 92 it is judged that the engine operating state is not the first $NO_X$ removal method region which is shown by the hatching in FIG. 20B, that is, when the $NO_X$ removal action by the first $NO_X$ removal method is not being performed, the routine proceeds to step 93. At step 93, lock-up control is performed. At this time, the lock-up clutch 66 is engaged by non-sliding engagement.

Figure 23:
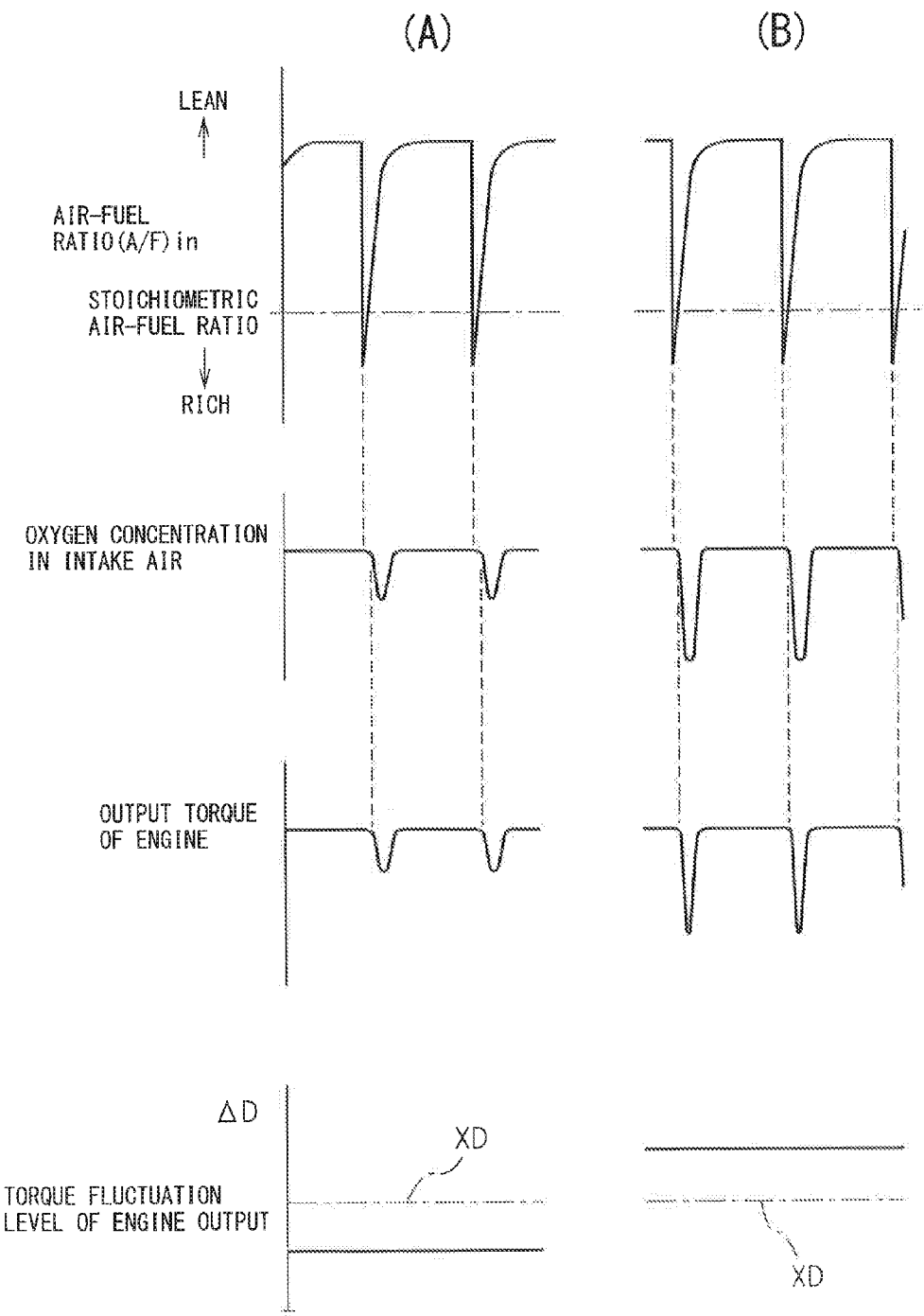
FIG. 23 is a view which shows changes in an air-fuel ratio of exhaust gas which flows into an exhaust purification catalyst etc.

Next, various embodiments which are designed to detect the torque fluctuation level $\Delta D$ of the engine output 61, compares this detected torque fluctuation level $\Delta D$ and torque fluctuation level XD which is shown in FIG. 3, and controls the engagement action of the lock-up clutch 66 will be explained. As explained above, this torque fluctuation level XD shows the boundary value of the torque fluctuation level which gives a passenger an uncomfortable feeling. If the torque fluctuation level $\Delta D$ of the engine output is lower than this boundary torque fluctuation level XD, a passenger is no longer given an uncomfortable feeling. FIG. 23 shows changes when the recirculation action of the exhaust gas using the low pressure exhaust gas recirculation system LPL is being performed and the $NO_X$ removal action by the first $NO_X$ removal method is being performed such as the change of the air-fuel ratio (A/F) in of the exhaust gas which flows into the exhaust purification catalyst 13, the change of the concentration of oxygen in the amount of intake air which is fed into the combustion chamber 2, the change of the output torque of the engine, and the change in the torque fluctuation level $\Delta D$ of the engine output. Further, FIG. 23 shows the boundary torque fluctuation level XD as well. Note that, (A) of FIG. 23 shows when the torque fluctuation level $\Delta D$ of the engine output is low, while (B) of FIG. 23 shows when the torque fluctuation level $\Delta D$ of the engine output is high.

The torque fluctuation level $\Delta D$ of the engine output is, for example, calculated from the amount of fluctuation of the speed of the output shaft of the engine in the electronic control unit 30. Further, in the embodiment according to the present invention, the torque fluctuation level of the input shaft 61 of the transmission 28, for example, is calculated from the amount of fluctuation of the speed of the input shaft 61 of the transmission 28 at the electronic control unit 30. In the fourth embodiment according to the present invention, if the recirculation action of the exhaust gas using the low pressure exhaust gas recirculation system LPL is being performed and the $NO_X$ removal action by the first $NO_X$ removal method is being performed, as shown in (A) of FIG. 23, the lock-up clutch 66 is made the non-sliding engaged state when the torque fluctuation level $\Delta D$ of the engine output is lower than the boundary torque fluctuation level XD and, as shown in (B) of FIG. 23, the lock-up clutch 66 is prohibited from becoming the non-sliding engaged state when the torque fluctuation level. $\Delta D$ of the engine output is higher than the boundary torque fluctuation level XD. That is, in this fourth embodiment, when the engagement action of the lock-up clutch 66 should be performed, if the exhaust gas recirculation action using the low pressure exhaust gas recirculation system LPL is being performed and hydrocarbons are injected from the hydrocarbon feed valve 15 by the predetermined period $\Delta T$, non-sliding engagement of the lock-up clutch 66 is prohibited when the magnitude of the torque fluctuation of the engine output exceeds a predetermined value.

Figure 24:
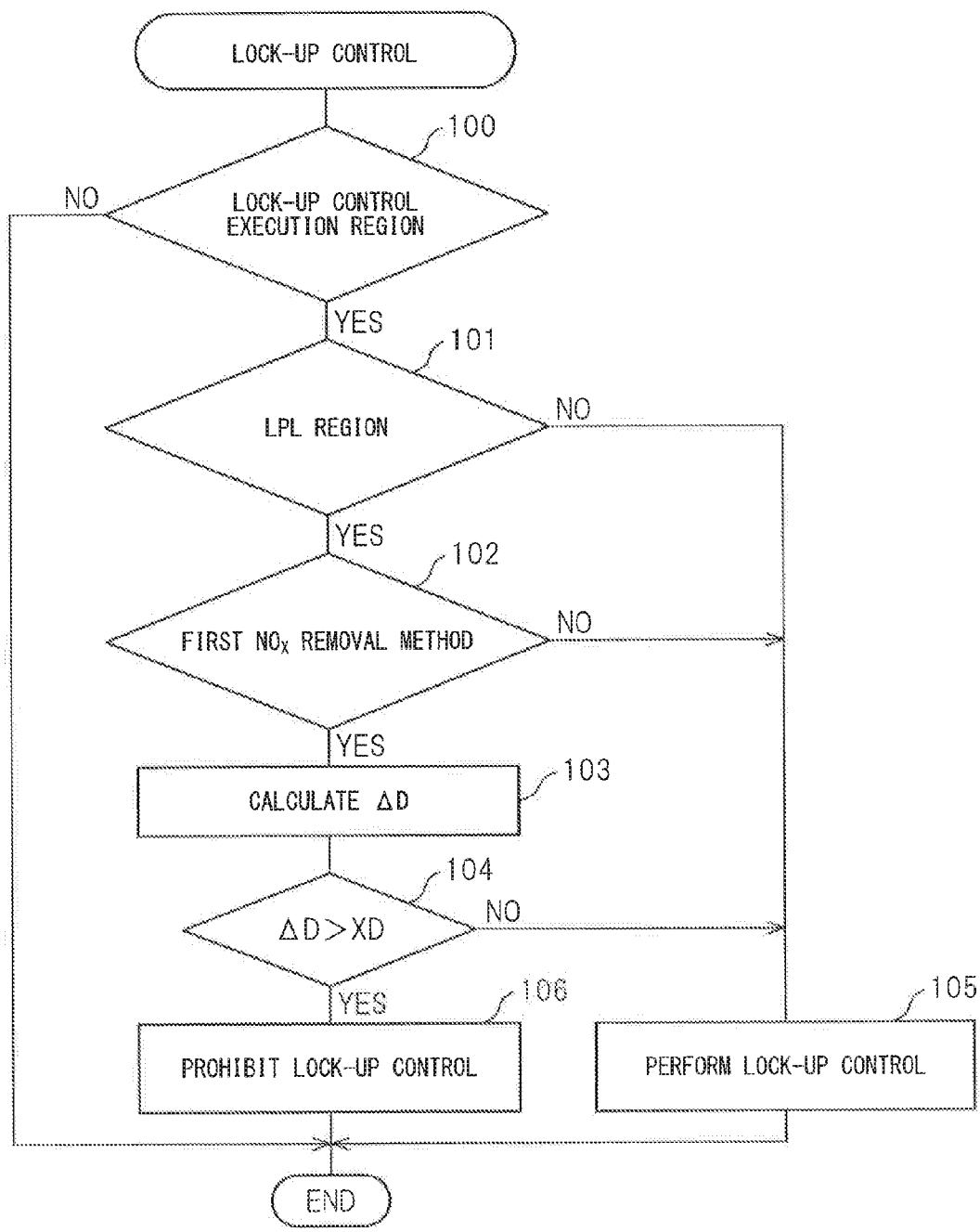
FIG. 24 is a flow chart of a still further embodiment for performing a lock-up control.

FIG. 24 shows the lock-up control routine for performing this fourth embodiment. Note that, this routine is executed by interruption every fixed time interval. Referring to FIG. 24, first, at step 100, it is judged if the engine operating state is in the lock-up control execution region which is shown by the hatching in FIG. 20C. When the engine operating state is not the lock-up control execution region, the processing cycle is ended, while when the engine operating state is in the lock-up control execution region, the routine proceeds to step 101. At step 101, it is judged if the engine operating state is in the LPL region which is shown by the hatching in FIG. 20A. When the engine operating state is in the LPL region, that is, when the recirculation action of the exhaust gas using the low pressure exhaust gas recirculation system LPL is being performed, the routine proceeds to step 102.

At step 102, it is judged if the engine operating state is in the first $NO_X$ removal method region which is shown by the hatching in FIG. 20B. When the engine operating state is in the first $NO_X$ removal method region, that is, when the $NO_X$ removal action by the first $NO_X$ removal method is being performed, the routine proceeds to step 103 where torque fluctuation level ΔT of the engine output is calculated. Next, at step 104, it is judged if the torque fluctuation level ΔD of the engine output is larger than the boundary torque fluctuation level XD. When the torque fluctuation level ΔD is larger than the boundary torque fluctuation level XD, the routine proceeds to step 106 where lock-up control is prohibited. At this time, in this fourth embodiment, to prevent the lock-up clutch 66 from becoming the non-sliding engaged state, the duty ratio of the drive pulse which is applied to the solenoid of the pressure control device 67 is made smaller.

As opposed to this, when at step 101 it is judged that the engine operating state is not the LPL region which is shown by the hatching in FIG. 20A, that is, when the recirculation action of the exhaust gas using the low pressure exhaust gas recirculation system LPL is not being performed, the routine proceeds to step 105, while when at step 102 it is judged that the engine operating state is not the first $NO_X$ removal method region which is shown by the hatching in FIG. 20B, that is, when the $NO_X$ removal action by the first $NO_X$ removal method is not being performed, the routine proceeds to step 105. Furthermore, when at step 104 it is judged that the torque fluctuation level ΔD of the engine output is smaller than the boundary torque fluctuation level XD, the routine proceeds to step 105. At step 105, lock-up control is performed. At this time, in this fourth embodiment, the lock-up clutch 66 is engaged by non-sliding engagement.

Next, a fifth embodiment which is designed to keep torque fluctuation from being felt by a passenger much at all even when the output torque of the engine fluctuates will be explained. In this fifth embodiment, to prevent the occurrence of torque fluctuation from being felt much at all by a passenger even if assuming the output torque of the engine fluctuates, when the recirculation action of the exhaust gas using the low pressure exhaust gas recirculation system LPL is being performed and the $NO_X$ removal action by the first $NO_X$ removal method is being performed, if the magnitude of the torque fluctuation of the engine output exceeds a predetermined value, lock-up clutch 66 is made a state not engaged at all. That is, in this fifth embodiment, in case where the exhaust gas recirculation action using the low pressure exhaust gas recirculation system LPL is being performed and hydrocarbons are injected from the hydrocarbon feed valve 15 by the predetermined period ΔT when the engagement action of the lock-up clutch 66 should be performed, if the magnitude of the torque fluctuation of the engine output exceeds a predetermined value, non-sliding engagement of the lock-up clutch 66 and additionally sliding engagement of the lock-up clutch 66 are prohibited. In this case, at step 106 of the lock-up control routine which is shown in FIG. 24, both non-sliding engagement of the lock-up clutch 66 and sliding engagement of the lock-up clutch 66 are prohibited.

Next, a sixth embodiment which is designed to reduce the level of the torque fluctuation which is felt by a passenger when the output torque of the engine fluctuates will be explained. In this sixth embodiment, to reduce the level of the torque fluctuation which is felt by a passenger, in case where the recirculation action of the exhaust gas using the low pressure exhaust gas recirculation system LPL is being performed and the $NO_X$ removal action by the first $NO_X$ removal method is being performed when the engagement action of the lock-up clutch 66 should be performed, if the magnitude of the torque fluctuation of the engine output exceeds a predetermined value, the lock-up clutch 66 is engaged by sliding engagement. That is, flex lock-up control of the lock-up clutch 66 is performed.

FIG. 25 shows a lock-up control routine for working this sixth embodiment. Note that, this routine is executed by interruption every fixed time interval. Referring to FIG. 25, first, at step 110, it is judged if the engine operating state is in the lock-up control execution region which is shown by the hatching in FIG. 20C. When the engine operating state is not in the lock-up control execution region, the processing cycle is ended, while when the engine operating state is in the lock-up control execution region, the routine proceeds to step 111. At step 111, it is judged if the engine operating state is in the LPL region which is shown by the hatching in FIG. 20A. When the engine operating state is in the LPL region, that is, when the recirculation action of the exhaust gas using the low pressure exhaust gas recirculation system LPL is being performed, the routine proceeds to step 112.

At step 112, it is judged if the engine operating state is in the first $NO_X$ removal method region which is shown by the hatching in FIG. 20B. When the engine operating state is in the first $NO_X$ removal method region, that is, when the $NO_X$ removal action by the first $NO_X$ removal method is being performed, the routine proceeds to step 113 where the torque fluctuation level ΔD of the engine output is calculated. Next, at step 114, it is judged if the torque fluctuation level ΔD of the engine output is larger than the boundary torque fluctuation level XD. When the torque fluctuation level. ΔD is larger than the boundary torque fluctuation level XD, the routine proceeds to step 116 where flex lock-up control of the lock-up clutch 66 is performed.

As opposed to this, when at step 111 it is judged that the engine operating state is not in the LPL region which is shown by the hatching in FIG. 20A, that is, when the recirculation action of the exhaust gas using the low pressure exhaust gas recirculation system LPL is not being performed, the routine proceeds to step 115, while when at step 112 it is judged that the engine operating state is not in the first $NO_X$ removal method region which is shown by the hatching in FIG. 20B, that is, when the $NO_X$ removal action by the first $NO_X$ removal method is not being performed, the routine proceeds to step 115. Furthermore, when at step 114 it is judged that the torque fluctuation level ΔD of the engine output is smaller than the boundary torque fluctuation level XD, the routine proceeds to step 115. At step 115, the lock-up control of the lock-up clutch 66 is performed. At this time, in this sixth embodiment, the lock-up clutch 66 is engaged by non-sliding engagement.

Next, a seventh embodiment which is designed so as to not make a passenger feel uncomfortable even if the output torque of the engine fluctuates will be explained. In this seventh embodiment, in the same way as the sixth embodiment, in the state where the recirculation action of the exhaust gas using the low pressure exhaust gas recirculation system LPL is being performed and the $NO_X$ removal action by the first $NO_X$ removal method is being performed, when the magnitude of the torque fluctuation of the engine output exceeds the predetermined value, flex lock-up control of the lock-up clutch 66 is performed. However, at this time, in this seventh embodiment, the torque fluctuation level $\Delta D$ of the input shaft 61 of the transmission 28 is made to become a predetermined boundary torque fluctuation level XD by feedback control of the engaged state of the lock-up clutch 66 by the pressure control device 67 so that even if the output torque of the engine fluctuates, the passenger is prevented from being given an uncomfortable feeling. Specifically speaking, the torque fluctuation level $\Delta D$ of the input shaft of the transmission is made to become a predetermined boundary torque fluctuation level XD by feedback control of the duty ratio of the drive pulse which is applied to the solenoid of the pressure control device 67. At this time, as shown in FIG. 3, the fluid sharing ratio becomes the rate which is shown by HR.

Next, an eighth embodiment which is designed to keep a passenger from being given an uncomfortable feeling when the output torque of the engine fluctuates will be explained. In this eighth embodiment, in the same way as the fourth embodiment which is shown in FIG. 24, in case where the recirculation action of the exhaust gas using the low pressure exhaust gas recirculation system LPL is being performed and the $NO_X$ removal action by the first $NO_X$ removal method is being performed when the engagement action of the lock-up clutch 66 should be performed, when the torque fluctuation level $\Delta D$ of the engine output is higher than the boundary torque fluctuation level XD, non-sliding engagement of the lock-up clutch 66 is prohibited. However, in this eighth embodiment, at this time, when the torque fluctuation level $\Delta D$ of the engine output is lower than the boundary torque fluctuation level XD, the lock-up clutch 66 is engaged by sliding engagement. That is, flex lock-up control of the lock-up clutch 66 is performed. When in this way the torque fluctuation level $\Delta D$ of the engine output is lower than the boundary torque fluctuation level XD, if the lock-up clutch 66 is made the sliding engaged state, it is possible to raise the power transmission efficiency of the torque converter 27 without giving a passenger an uncomfortable feeling.

In this way, in the eighth embodiment, in case where the exhaust gas recirculation action using the low pressure exhaust gas recirculation system LPL is performed and hydrocarbons are injected from the hydrocarbon feed valve 15 by a predetermined period $\Delta T$ when the engagement action of the lock-up clutch 66 should be performed, non-sliding engagement of the lock-up clutch 66 and sliding engagement of the lock-up clutch 66 are prohibited when the magnitude of the torque fluctuation of the engine output exceeds a predetermined value, while the lock-up clutch 66 is engaged by sliding engagement when the magnitude of the torque fluctuation of the engine output is smaller than a predetermined value.

Figure 26:
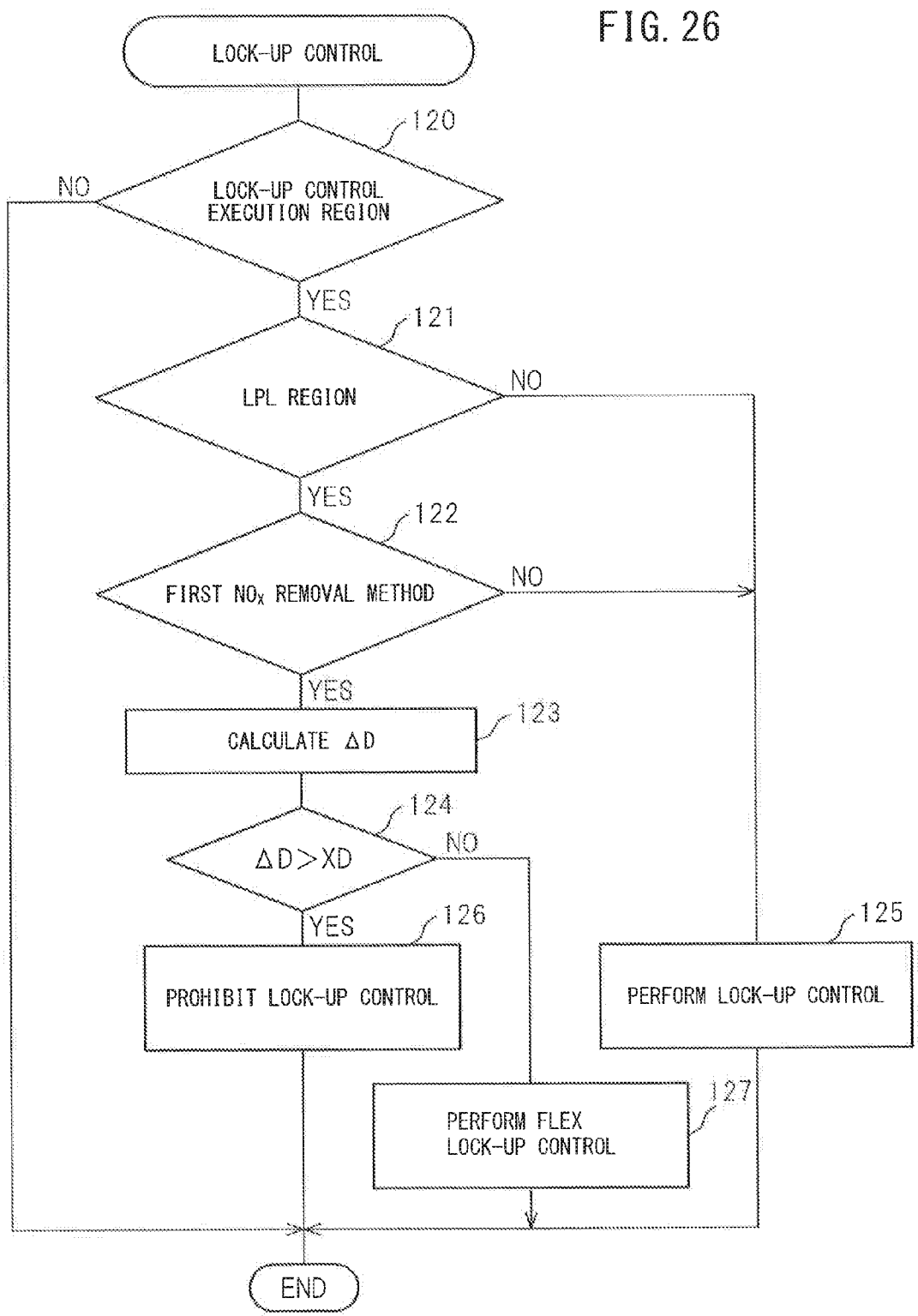
FIG. 26 is a flow chart of a still further embodiment for performing a lock-up control.

FIG. 26 shows a lock-up control routine for working this eighth embodiment. Note that, this routine is executed by interruption every fixed time interval. Referring to FIG. 26, first, at step 120, it is judged if the engine operating state is in the lock-up control execution region which is shown by the hatching in FIG. 20C. When the engine operating state is not in the lock-up control execution region, the processing cycle is ended, while when the engine operating state is in the lock-up control execution region, the routine proceeds to step 121. At step 121, it is judged if the engine operating state is in the LPL region which is shown by the hatching in FIG. 20A. When the engine operating state is in the LPL region, that is, when the recirculation action of the exhaust gas using low pressure exhaust gas recirculation system LPL is being performed, the routine proceeds to step 122.

At step 122, it is judged if the engine operating state is in the first $NO_X$ removal method region which is shown by the hatching in FIG. 20. When the engine operating state is in the first $NO_X$ removal method region, that is, when the $NO_X$ removal action by the first $NO_X$ removal method is being performed, the routine proceeds to step 123 where the torque fluctuation level $\Delta D$ of the engine output is calculated. Next, at step 124, it is judged if the torque fluctuation level $\Delta D$ of the engine output is larger than the boundary torque fluctuation level XD. When the torque fluctuation level $\Delta D$ is larger than the boundary torque fluctuation level. XD, the routine proceeds to step 126 where non-sliding engagement of the lock-up clutch 66 is prohibited. As opposed to this, when at step 124 it is judged that the torque fluctuation level $\Delta D$ of the engine output is smaller than the boundary torque fluctuation level XD, the routine proceeds to step 127 where the lock-up clutch 66 is engaged by sliding engagement. That is, flex lock-up control of the lock-up clutch 66 is performed.

On the other hand, when at step 121 it is judged that the engine operating state is in the LPL region which is shown by the hatching in FIG. 20A, that is, when the recirculation action of the exhaust gas using the low pressure exhaust gas recirculation system LPL is not being performed, the routine proceeds to step 125, while when at step 122 it is judged that the engine operating state is not in the first $NO_X$ removal method region which is shown by the hatching in FIG. 20B, that is, when the $NO_X$ removal action by the first $NO_X$ removal method is not being performed, the routine proceeds to step 125. At step 125, lock-up control of the lock-up clutch 66 is performed. At this time, in this eighth embodiment, the lock-up clutch 66 is engaged by non-sliding engagement.

Note that, as another embodiment, it is also possible to arrange an oxidation catalyst for reforming the hydrocarbons in the engine exhaust passage upstream of the exhaust purification catalyst 13.

REFERENCE SIGNS LIST 4 intake manifold
5 exhaust manifold
7 exhaust turbocharger
12a, 12b exhaust pipe
13 exhaust purification catalyst
14 particulate filter
15 hydrocarbon feed valve
28 torque converter
66 lock-up clutch
HPL high pressure exhaust gas recirculation system
LPL low pressure exhaust gas recirculation system

The invention claimed is:
1. An internal combustion engine comprising:
an engine exhaust passage;
an exhaust purification catalyst arranged in the engine exhaust passage;
a hydrocarbon feed valve arranged in the engine exhaust passage upstream of the exhaust purification catalyst;
precious metal catalysts carried on exhaust gas flow surfaces of the exhaust purification catalyst;
basic exhaust gas flow surface parts formed around the precious metal catalysts, the exhaust purification catalyst having a property of chemically reducing $NO_x$ contained in the exhaust gas when a concentration of hydrocarbons flowing from the hydrocarbon feed valve and into the exhaust purification catalyst is made to vibrate within a predetermined range of amplitude and within a predetermined range of period and having a property of being increased in a storage amount of $NO_x$ contained in the exhaust gas when a vibration period of the hydrocarbon concentration is made longer than the predetermined range of period, $NO_x$ contained in the exhaust gas being removed at the exhaust purification catalyst when hydrocarbons are injected from the hydrocarbon feed valve within said predetermined range of period during engine operation;

a low pressure exhaust gas recirculation system which causes exhaust gas in the engine exhaust passage downstream of the exhaust purification catalyst to be recirculated into an intake passage;

a torque converter provided with a lock-up clutch and arranged between an output shaft of the engine and a transmission, the output shaft of the engine being fluidly coupled with an input shaft of the transmission when the engagement action of the lock-up clutch is not being performed, the output shaft of the engine being mechanically coupled with the input shaft of the transmission when the engagement action of the lock-up clutch is being performed; and an electric control unit configured to control the lock-up clutch, wherein when an engagement action of the lock-up clutch should be performed, if an exhaust gas recirculation action by the low pressure exhaust gas recirculation system is being performed and hydrocarbons are injected from the hydrocarbon feed valve within said predetermined range of period, non-sliding engagement of the lock-up clutch is prohibited and the lock-up clutch is engaged by sliding engagement constantly or in accordance with a magnitude of a torque fluctuation of an engine output.

2. The internal combustion engine as claimed in claim 1, wherein when the engagement action of the lock-up clutch should be performed, if said exhaust gas recirculation action by the low pressure exhaust gas recirculation system is being performed and hydrocarbons are injected from the hydrocarbon feed valve within said predetermined range of period, non-sliding engagement of the lock-up clutch is prohibited and the lock-up clutch is engaged by sliding engagement when the magnitude of the torque fluctuation of the engine output exceeds a predetermined value.

3. The internal combustion engine as claimed in claim 2, wherein the engine further comprises a pressure control device for controlling an engaged state of the lock-up clutch and when the lock-up clutch is engaged by sliding engagement, the torque fluctuation level of the input shaft of the transmission is made to become a predetermined boundary torque fluctuation level by using said pressure control device for feedback control of the engaged state of the lock-up clutch.

4. The internal combustion engine as claimed in claim 1, wherein when the engagement action of the lock-up clutch should be performed, if said exhaust gas recirculation action by the low pressure exhaust gas recirculation system is being performed and hydrocarbons are injected from the hydrocarbon feed valve within said predetermined range of period, non-sliding engagement of the lock-up clutch and sliding engagement of the lock-up clutch are prohibited when the magnitude of the torque fluctuation of the engine output exceeds a predetermined value and the lock-up clutch is engaged by sliding engagement when the magnitude of the torque fluctuation of the engine output is smaller than the predetermined value.

5. The internal combustion engine as claimed in claim 1, wherein a first $NO_x$ removal method which injects hydrocarbons from the hydrocarbon feed valve within said predetermined range of period to thereby remove $NO_x$ which is contained in exhaust gas and a second $NO_x$ removal method which makes an air-fuel ratio of the exhaust gas flowing into the exhaust purification catalyst rich by a period longer than said predetermined range of period to thereby release stored $NO_x$ from the exhaust purification catalyst to remove $NO_x$ are selectively used and wherein when a $NO_x$ removal action by the second $NO_x$ removal method is being performed in the state where said exhaust gas recirculation action by the low pressure exhaust gas recirculation system is being performed, if the air-fuel ratio of the exhaust gas flowing into the exhaust purification catalyst is made rich to release the stored $NO_x$ from the exhaust purification catalyst, the exhaust gas recirculation action by the low pressure exhaust gas recirculation system is temporarily stopped.

* * * * *